United States Patent [19]

Wysocki et al.

[11] Patent Number: 5,177,562
[45] Date of Patent: Jan. 5, 1993

[54] STABILITY COMPENSATED BROADBAND SOURCE AND FIBER INTERFEROMETER

[75] Inventors: Paul F. Wysocki, Stanford; Michel J. F. Digonnet, Palo Alto, both of Calif.; Byoung Y. Kim, Seoul, Rep. of Korea; Herbert J. Shaw, Stanford, Calif.

[73] Assignee: The Board of Trustees of the Leland Stanford Junior University, Stanford, Calif.

[21] Appl. No.: 880,290

[22] Filed: May 4, 1992

Related U.S. Application Data

[63] Continuation of Ser. No. 584,806, Sep. 18, 1990.

[51] Int. Cl.$^5$ .............................................. G01C 19/72
[52] U.S. Cl. ..................................... 356/350; 372/6; 372/29
[58] Field of Search ..................... 356/345, 350; 372/6, 372/29, 32, 69, 94; 350/96.15

[56] References Cited

U.S. PATENT DOCUMENTS

| | | |
|---|---|---|
| 4,386,822 | 6/1983 | Bergh . |
| 4,410,275 | 10/1983 | Shaw et al. . |
| 4,456,377 | 6/1984 | Shaw et al. . |
| 4,493,528 | 1/1985 | Shaw . |
| 4,529,312 | 7/1985 | Pavlath et al. . |
| 4,536,058 | 8/1985 | Shaw et al. . |
| 4,564,262 | 1/1986 | Shaw . |
| 4,601,541 | 7/1986 | Shaw et al. . |
| 4,634,282 | 1/1987 | Shaw et al. . |
| 4,637,025 | 1/1987 | Snitzer et al. ........................ 372/6 |
| 4,637,722 | 1/1987 | Kim . |
| 4,687,330 | 8/1987 | Lefevre . |
| 4,773,759 | 9/1988 | Bergh et al. . |
| 4,779,975 | 10/1988 | Kim . |
| 4,881,817 | 11/1989 | Kim et al. . |
| 4,938,556 | 7/1990 | Digonnet et al. ............... 350/96.15 |

OTHER PUBLICATIONS

"Broadband Operation of Eabium–Doped Silica–Based Fiber Lasers", Wysocki et al., Fiber Laser Sources & Amps, Sep. 1989 pp. 261–270.
W. J. Miniscalco, B. A. Thompson, E. Eichen, T. Wei, "Very High Gain Er$^{3+}$Fiber Amplifier Pumped at 980 nm," Technical Digest of Optical Fiber Communication Conference (OFC), Paper FA2, Jan. 1990.
C. Brecher and L. A. Riseberg, "Line–Narrowed Fluorescence Spectra and Site–Dependent Transition Probabilties of Nd$^{3+}$in Oxide and Fluoride Glasses", Physical Review B 18, 10, pp. 5799–5811, Nov. 1978.
I. N. Duling III, W. K. Burns, L. Goldberg, "High Power Superfluorescent Fiber Source," Optic Letters, vol. 15, No. 33, p. 199.

(List continued on next page.)

Primary Examiner—Samuel A. Turner
Attorney, Agent, or Firm—Knobbe, Martens, Olson & Bear

[57] ABSTRACT

The present invention discloses a thermally stable rare-earth doped fiber source comprising an active medium such as Erbium or Neodymium. The thermal stability of the mean wavelength of such a source is determined by three contributions as expressed by the following differential equation:

$$\frac{d\langle\lambda_s\rangle}{dT} = \frac{\delta\langle\lambda_s\rangle}{\delta T} + \left(\frac{\delta\langle\lambda_s\rangle}{\delta P}\right)\left(\frac{\delta P}{\delta T}\right) + \left(\frac{\delta\langle\lambda_s\rangle}{\delta\lambda_p}\right)\left(\frac{\delta\lambda_p}{\delta T}\right)$$

The first term is the intrinsic temperature dependence of the active medium, the second term is the pump power dependence and the third term is a contribution that arises from the dependence of the emission wavelength on the pump wavelength. The method of the present invention minimizes the temperature dependence on the mean wavelength by using the above equation and optimizing the values of the pump power and the pump wavelength so that the three contributions in the governing equation cancel each other.

42 Claims, 13 Drawing Sheets

OTHER PUBLICATIONS

K. Fesler, M. Digonnet, K. Liu, B. Y. Kim, and H. J. Shaw, "Broadband Diode-Pumped Fibre Laser," *Electronics Letters*, vol. 24, No. 14, pp. 838-840, Jul. 7, 1988.

S. Zemon et al., "Characterization of Er+-doped Glasses by Fluorescence Line Narrowing," *Proc. SPIE*, vol. 1171, Fiber Laser Sources and Amplifiers, Boston, Mass. (Sep. 1989), pp. 219-235.

C. J. Koester and E. Snitzer, "Amplification in a Fiber Laser," *Applied Optics*, vol. 3, No. 10, Oct. 1964, pp. 1182-1186.

R. F. Schuma and K. M. Killian, "Superluminescent Diode (SLD) Wavelength Control in High Performance Fiber Optic Gyroscope," *Proc. SPIE*, vol. 719, Fiber Optic Gyros: 10th Anniversary Conference (1986), pp. 192-196.

K. A. Fesler, M. J. F. Digonnet, B. Y. Kim and H. J. Shaw, "Stable Fiber-Source Gyroscopes," *Optics Letters*, vol. 15, No. 22, Nov. 15, 1990, pp. 1321-1323.

P. F. Wysocki, M. J. F. Digonnet and B. Y. Kim, "Broadband Operation of Erbium-Doped Silica-Based Fiber Lasers," *SPIE*, vol. 1171, Fiber Laser Sources and Amplifiers (1989), pp. 261-269.

P. F. Wysocki, M. J. F. Digonnet and B. Y. Kim, "Broad-Spectrum, Wavelength-Swept, Erbium-Doped Fiber Laser at 1.55 $\mu$m," *Optics Letters*, vol. 15, No. 16, Aug. 15, 1990, pp. 879-881.

P. F. Wysocki, M. J. F. Digonnet and B. Y. Kim, "Spectral Characterstics of High-Power 1.55 $\mu$m Broad-Band Superluminescent Fiber Sources," *IEEE Photonics Technology Letters* vol. 2, No. 3, pp. 178-180 (Mar. 1990).

C. C. Cutler, S. A. Newton and H. J. Shaw, "Limitation of Rotating Sensing by Scattering," *Optics Letters*, vol. 5, pp. 488-490, Nov. 1980.

H. C. Lefevre, J. P. Bettini, S. Vatoux and M. Papuchon, "Progress in Optical Fiber Gyroscopes Using Integrated Optics," Nato Agard Meeting of the Electromagnetic Wave Propagation Panel on Guided Optical Structures in the Military Environment, Istanbul, Turkey, Sep. 1985.

P. R. Morkel, E. M. Taylor, J. E. Townsend and D. H. Payne, "Wavelength Stability of $Nd^{3+}$-doped Fibre Fluorescent Sources," *Electronics Letters*, vol. 26, No. 13, pp. 873-875 (Jun. 21, 1990).

L. Reekie, I. M. Jauncey, S. B. Poole and D. N. Payne, "Diode-Laser-Pumped operation of an $Er^3$-Doped Single-Mode Fibre Laser", *Electronics Letters*, vol. 23, No. 20, p. 1076, Sep. 24, 1987.

W. L. Barnes, P. R. Morkel, L. Reekie and D. N. Payne, "High-Quantum-Efficiency $Er^{3+}$ Fiber Lasers Pumped at 980 nm," *Optics Letters*, vol. 14, No. 18, pp. 1002-1004 (Sep. 15, 1989).

J. L. Zyskind, C. R. Giles, E. Desurvire and J. R. Simpson, Optimal Pump Wavelength in the $^4I_{15/2}$-$^4I_{13/2}$ "Absorption Band for Efficient $Er^{3+}$-doped Fiber Amplifiers," *IEEE Photonics Technology Letters*, vol. 1, No. 12, p. 428 and p. 430 (Dec. 1989).

Emmanuel Desurvire, C. R. Giles and J. R. Simpson, "Gain Saturation Effects in High-Speed, Multichannel Erbium-Doped Fiber Amplifiers at $1 = 1.53$ $\mu$m," *Journal of Lightwave Technology*, vol. 7, No. 12, pp. 2095-2104 (Dec. 1989).

W. K. Burns, I. N. Duling, III, L. Goldberg, R. P. Moeller, C. A. Villarruel, E. Snitzer and H. Po, "Fiber Superflouorescent Sources for Fiber Gyro Applications", *Optical Fiber Sensors*, vol. 44 of Springer Proceedings in Physics, H. J. Arditty, J. P. Dakin and R. Th. Kersten, eds. (Springer-Verlag, Berlin, 1989), pp. 137-142.

K. Liu, M. Digonnet, H. J. Shaw, B. J. Ainslie and S. P. Craig, "10 mW Superfluorescent Single-Mode Fibre Source at 1060 nm", Sep. 21, 1987.

K. Liu, M. Digonnet, K. Fesler, B. Y. Kim and H. J. Shaw, "Superflouorescent Single Mode Nd: Fiber Source at 1060 nm", in *Digest of Conference on Optical Fiber Sensors* (Optical Society of America, Washington, D.C., 1988), paper FDD5, pp. 462-465.

K. A. Fesler, R. F. Kalman, M. J. F. Digonnet, B. Y. Kim and H. J. Shaw, "Behavior of broadband fiber sources in a fiber gyroscope", *SPIE, vol. 1171, pp. 346-351, (1989).*

W. K. Burns, et al., "Fiber-Optic Gyroscopes with Broadband Sources," *Journal of Lightwave Technology*, vol. LT-1, No. 1, pp. 98-105, Mar. 1983.

E. Desurvire et al., "Amplification of Spontaneous Emission in Erbium-Doped Single-Mode Fibers," *Journal of Lightwave Technology*, vol. 7, No. 5, pp. 835-845 (May 1989).

P. R. Morkel, "Erbium-Doped Fibre Superluminescent Source for the Fibre Gyroscope," *Springer Proceedings in Physics*, vol. 44, in *Optical Fiber Sensors*, Springer-Verlag, Berlin, Heidelberg 1989, pp. 143-148.

K. Bohm, P. Marten, K. Peterman, E. Weidel and R. Ulrich, "Low-Drift Fibre Gyro using a Superluminescent Diode", *Electronics Letters*, vol. 17, pp. 352-353 (1981).

STABILITY COMPENSATED BROADBAND SOURCE AND FIBER INTERFEROMETER

This application is a continuation of application Ser. No. 584,806, filed Sep. 18, 1990.

BACKGROUND OF THE INVENTION

The present invention is in the field of broadband sources, and more particularly, in the field of rare earthdoped superfluorescent fiber sources in which an optical fiber is doped with a medium that can lase and in which the optical fiber is pumped with a pump optical signal to generate an output signal to be detected by a detector.

Optical fibers are being used for an increasing number of applications. One such application is an optical fiber rotation sensor comprising a loop of optical fiber into which two light signals are introduced and caused to counterpropagate around the optical loop. Such rotation sensors are described, for example, in U.S. Pat. No. 4,410,275; U.S. Pat. No. 4,456,377; U.S. Pat. No. 4,687,330; U.S. Pat. No. 4,634,282; and U.S. Patent No. 4,637,722. These patents are hereby incorporated by reference herein. For such rotation sensors and for other optical fiber applications, it is desirable to have a stable well-controlled light source.

For some applications, such as certain optical fiber rotation sensors, a high power broadband optical energy source having a short temporal coherence length and no longitudinal mode structure at longer wavelengths is desirable. It has been demonstrated that using a broadband optical energy source in an optical fiber rotation sensor, for example, reduces phase errors caused by the Kerr effect. A broadband optical signal can also be advantageously used to reduce phase errors in the combined optical signal from the loop of the rotation sensor caused by coherent backscattering (i.e., Rayleigh backscattering) and by polarization cross-coupling in the loop. See, for example, U.S. Pat. No. 4,773,759; U.S. patent application Ser. No. 488,732, filed on Apr. 26, 1983; and U.S. Pat. application Ser. No. 909,741, filed on Sep. 19, 1986; all of which are assigned to the assignee of the present application. These patents and patent applications are hereby incorporated by reference herein. A theoretical analysis regarding the broadband source requirement for fiber gyroscopes can be found in W. K. Burns, et al., "Fiber-Optic Gyroscopes with Broad-Band Sources," *Journal of Lightwave Technology*, Volume LT-1, Number 1, pp. 98–105, March 1983. This article is hereby incorporated by reference herein. Optical fiber rotation sensors also require sources with highly stable mean wavelengths with little thermal drift. A rotation sensor source must also have the ability to couple high power into the rotation sensor without creating large noise components (high signal/noise ratio). Finally, an ideal rotation sensor source preferably operates in higher wavelength region of the optical spectrum of the source in order to reduce any sensitivity to radiation.

Such broadband optical sources include, for example, superluminescent light emitting diodes, and the like. An exemplary superluminescent diode has a relatively broad optical linewidth (e.g. approximately 15 nm) at the optical wavelengths in the range of 800 to 850 nm, for example. However, for a given power input, exemplary superluminescent diodes may not provide an adequate amount of optical energy when compared to a laser, for example. More importantly, superluminescent diodes cannot be easily coupled to certain optical devices such as gyroscopes as the light emitted by superluminescent diodes is highly divergent. In particular, the power produced by a superluminescent diode is difficult to efficiently couple into single-mode fibers. Furthermore, it is known that the temperature stability of the emission wavelength of a typical superluminescent diode is not satisfactory for numerous applications. The mean wavelength of superluminescent diodes varies about $-300$ ppm/°C., which is inadequate for high sensitivity gyroscope applications that often require a mean wavelength stable to about 1 ppm.

More recently, U.S. Pat. No. 4,637,025 to Snitzer, et al., described a superradiant light source that includes an optical fiber having a core doped with a selected active laser material such as Neodymium.

U.S. patent application Ser. No. 281,088, filed on Dec. 7, 1988, discloses a superfluorescent broadband fiber source comprising a fiber doped with laser material coupling to a multiplexing coupler. This application is assigned to the assignee of the present application. Such a superfluorescent source has good output power and easily couples to an optical fiber rotation sensor. It does not have longitudinal cavity modes and shows good thermal stability. Its spectrum is much broader than a resonant laser source. The above patent and patent application are hereby incorporated by reference herein.

U.S. patent application Ser. No. 176,739, filed on April 1988, describes a broadband light source which uses an optical fiber doped with a lasing material such as Neodymium. This application is assigned to the assignee of the present application and is hereby incorporated by reference herein. The optical fiber is pumped with a pump optical signal having a pump wavelength selected to cause spontaneous emission of an optical signal at a second wavelength different from the pump wavelength. The wavelength of the pump optical signal is selected to be outside the pump variable tuning range of the Neodymium-doped optical fiber (i.e., the range of pump wavelengths which stimulate emitted wavelengths having an average wavelength with a generally one-to-one correspondence to the pump wavelength). Pumping with a pump signal outside the pump variable tuning ranges causes the emitted light to have a broad spectral envelope of longitudinal modes having emission wavelengths corresponding to substantially all the pump variable tuning range.

Neodymium-doped superfluorescent fiber sources have therefore alleviated the problems raised by either resonant cavity lasers or superluminescent diodes. Such sources can deliver milliwatts of power into a fiber optic gyroscope with broadband spectra and good thermal stability.

In recent years, Erbium-doped fibers have received increasing attention as possible sources and for amplification purposes in the low loss fiber communication window at 1500 nm. It is possible to obtain a high gain when the Erbium dopant is properly doped into the fiber, typically a silica fiber. The light emitted by Erbium-doped fibers easily couples into other fibers with similar mode sizes. An Erbium-doped fiber is also thermally relatively stable. Additionally, Erbium-doped fibers emit longer wavelength light than Neodymium-doped fibers, which makes them less sensitive to radiation induced loss mechanisms.

A theoretical analysis of amplified spontaneous emission can be found in an article by E. Desurvire et al, "Amplification of Spontaneous Emission in Erbium-Doped Single-Mode Fibers," *Journal of Lightwave Technology*, Volume 7, No. 5, pp. 835–845 (May 1989). The operation of an Erbium-doped silica fiber as a superfluorescent source at 1535 nm and pumped at 980 nm is also reported in an article by P. R. Morkel, "Erbium-Doped Fibre Superluminescent Source for the Fibre Gyroscope," *Springer Proceedings in Physics*, Volume 44, in *Optical Fiber Sensors*, Springer-Verlag Berlin, Heidelberg 1989. This article analyses the variation of superfluorescent output power with the pump power and the fiber length and observes the dependence of the spectrum of the superfluorescent emission on fibre length, pump power and fiber temperature. However, that article does not propose any method for minimizing the thermal variations of the output spectrum.

Although both Neodymium- and Erbium-doped fiber sources have a much better temperature stability than superluminescent diodes and resonant cavity lasers, there still is a need for a high power broadband light source using an optical fiber structure with very little thermal drift.

It is therefore an object of the present invention to substantially improve the thermal dependence of those thermal sources by a factor between 5 and 10, thereby reducing the thermal variation to only a few ppm/°C. and even in optimal conditions determined by the method of the present invention, to less than 1 ppm/°C.

SUMMARY OF THE INVENTION

According to a first aspect of the present invention, there is disclosed a broadband source having an emission spectrum, the emission spectrum being characterized by a mean wavelength, the source comprising an active medium which is pumped at a pump wavelength by a pump source to cause the active medium to emit radiation. The pump power and the pump wavelength of the pump source are selected so as to minimize the sum of the intrinsic temperature dependence of the active medium, the pump power dependence of the mean wavelength and the pump wavelength dependence of the mean wavelength, the sum being defined as:

$$\frac{\delta <\lambda_s>}{\delta T} + \left(\frac{\delta <\lambda_s>}{\delta P}\right)\left(\frac{\delta P}{\delta T}\right) + \left(\frac{\delta <\lambda_s>}{\delta \lambda_p}\right)\left(\frac{\delta \lambda_p}{\delta T}\right)$$

wherein
$<\lambda_s>$ is the mean wavelength of the signal;
T is the temperature;
P is the pump power of the pump source; and
$\lambda_p$ is the wavelength of the light emitted by the pump source.

The pump source may be a laser diode. The active medium preferably comprises a single-mode fiber doped with lasing material, which can be Erbium or Neodymium.

The pump wavelength and the pump power can also be selected so as to obtain an extremum of the function $<\lambda_s> = \lambda$ (T, P, $\lambda_p$). Preferably, the pump wavelength and the pump power are selected such that one of the terms of the governing equation is zero, and the sum of the other two terms is as small as possible. These other two terms may be as close to zero as possible or substantially equal and of opposite signs.

The pump wavelength is preferably selected to correspond to a peak pump absorption rate of the pump source or close to it. One of the peak pump absorption rate wavelengths is near 980 nm in the case of Erbium.

The pump power and the pump wavelength are preferably selected so that the total variation of the mean wavelength with respect to temperature is less than 10 ppm/°C., and preferably, approximately 1 ppm/°C.

The broadband source of the present invention preferably comprises an optical fiber having an input and an output ends and having at least a reflector positioned proximate to the input end of the optical fiber. The reflector is preferably substantially transmissive to the emitted radiation and substantially reflective to the pump light. Alternatively, the source may comprise a reflector which is substantially reflective to the emitted radiation and substantially transmissive to the pump light. Such reflector can be a dichroic mirror.

The broadband source of the present invention can operate in different configurations: backward single pass, forward single pass, backward double pass or forward single pass configuration. It may also comprise a resonant fiber laser or a wavelength swept fiber laser.

According to another aspect of the present invention, there is also disclosed an optical sensor for sensing an ambient effect, preferably rotation, comprising a loop comprising an optical fiber having two polarization modes; and a broadband laser source for introducing light into the loop, the source having an active medium which emits radiation in an emission spectrum in response to application of pump energy to the active medium, the active medium being pumped at a pump wavelength by a pump source to cause the active medium to emit radiation. The pump power and the pump wavelength of the pump source are selected so as to minimize the sum of the intrinsic temperature dependence of the active medium, the pump power dependence of the mean wavelength and the pump wavelength dependence of the mean wavelength, the sum being defined as:

$$\frac{\delta <\lambda_s>}{\delta T} + \left(\frac{\delta <\lambda_s>}{\delta P}\right)\left(\frac{\delta P}{\delta T}\right) + \left(\frac{\delta <\lambda_s>}{\delta \lambda_p}\right)\left(\frac{\delta \lambda_p}{\delta T}\right)$$

wherein
$<\lambda_2>$ is the mean wavelength of the signal;
T is the temperature;
P is the pump power of the pump source; and
$\lambda_p$ is the wavelength of the light emitted by the pump source.

According to another aspect of the present invention, there is disclosed an apparatus, comprising an interferometer, a pump light source that emits pump light and a broadband light source having an emission spectrum, the emission spectrum being characterized by a mean wavelength, the source comprising an active medium, the active medium being pumped at a pump wavelength by the pump source to cause the active medium to emit radiation. The pump power and the pump wavelength of the pump source are selected so as to minimize the sum of the intrinsic temperature dependence of the active medium, the pump power dependence of the mean wavelength and the pump wavelength dependence of the mean wavelength, the sum being defined as:

$$\frac{\delta <\lambda_s>}{\delta T} + \left(\frac{\delta <\lambda_s>}{\delta P}\right)\left(\frac{\delta P}{\delta T}\right) + \left(\frac{\delta <\lambda_s>}{\delta \lambda_p}\right)\left(\frac{\delta \lambda_p}{\delta T}\right)$$

wherein $<\lambda_s>$ is the mean wavelength of the signal;
T is the temperature;
P is the pump power of the pump source; and
$\lambda_p$ is the wavelength of the light emitted by the pump source.

The interferometer preferably comprises a Sagnac interferometer. The active medium may comprises an Erbiumdoped single mode optical fiber or a Neodymium-doped single mode optical fiber.

According to another aspect of the present invention, there is disclosed a method for stabilizing the temperature dependence of a broadband source comprising an active medium and having an emission spectrum, comprising the steps of pumping an active medium by means of a pump source at a pump wavelength to cause the active medium to emit radiation, the emission spectrum being characterized by a mean wavelength; and selecting the pump power and the pump wavelength of the pump source so as to minimize the total variation of the mean wavelength with respect to temperature, the pump power and the pump wavelength minimizing the sum of the intrinsic temperature dependence of the active medium, the pump power dependence of the mean wavelength and the pump wavelength dependence of the mean wavelength, the sum being defined as:

$$\frac{\delta <\lambda_s>}{\delta T} + \left(\frac{\delta <\lambda_s>}{\delta P}\right)\left(\frac{\delta P}{\delta T}\right) + \left(\frac{\delta <\lambda_s>}{\delta \lambda_p}\right)\left(\frac{\delta \lambda_p}{\delta T}\right)$$

wherein $<\lambda_2>$ is the mean wavelength of the signal;
T is the temperature;
P is the pump power of the pump source; and
$\lambda_p$ is the wavelength of the light emitted by the pump source.

The active material of the active medium may be selected among the rare earth group. An optical fiber preferably supports the active medium. The pump wavelength and the pump power are preferably selected such as to obtain an extremum of the following function $<\lambda_s> = (T, P, \lambda_p)$. They may also be selected such that one of the terms of the governing equation is zero, and the sum of the other two terms is as small as possible, either by being as close to zero as possible or by being substantially equal and of opposite signs.

Preferably, the pump wavelength corresponds to a peak pump absorption rate of the pump source or close to it. Preferably, the peak pump absorption rate wavelength at or near 980 nm is selected in the case of Erbium.

The pump wavelength and the pump wavelength are preferably selected so that the total variation of the mean wavelength with respect to temperature is less than 10 ppm/°C., preferably approximately 1 ppm/°C.

DESCRIPTION OF THE PREFERRED EMBODIMENTS

Figure 1:
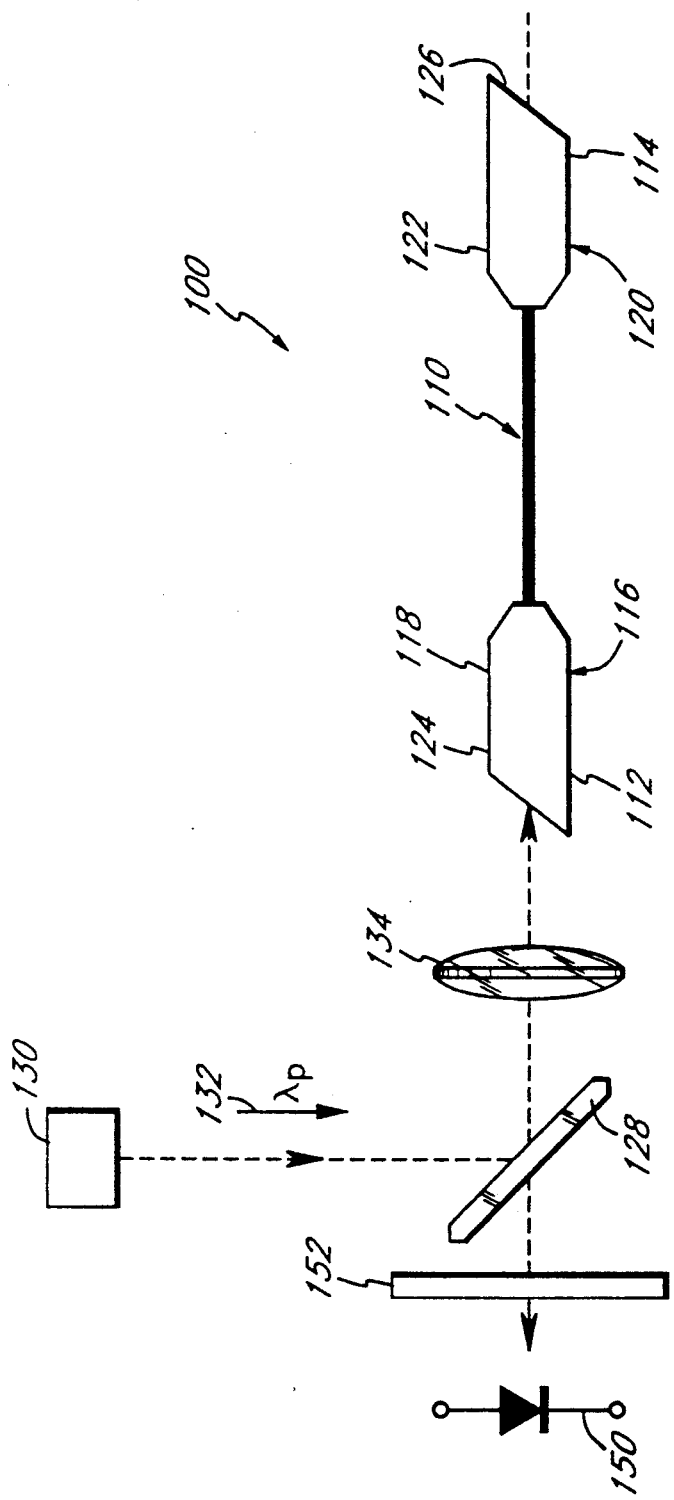
FIG. 1 illustrates an exemplary embodiment of a broadband source of the present invention comprising an Erbium-doped fiber operated in backward single-pass configuration.

Before describing the method and the preferred embodiments of the present invention, it will be useful to describe the underlying physical phenomena in order to understand the temperature dependence of rare earth-doped fiber sources.

Thermal Dependence of Rare Earth-Doped Fiber Sources

The spectrum of a source can generally vary with temperature either because the energy levels of the active medium of the source are temperature sensitive or because the occupation of the various levels change with temperature. In rare-earth-doped silica fibers, the energy levels are insensitive to environmental changes because the active 4f shell electrons are well shielded by 6s shell electrons in larger orbitals. This makes them excellent candidates for stable fiber sources. The various pertinent energy states of the active ions, including the ground state, pump state, upper laser state and lower laser state all consist of a series of closely separated Stark split energy levels. The levels in each of these manifolds are close enough together and broadened enough to produce spectral overlap with other levels and rapid relaxation between levels. Hence, the occupation of each manifold is assumed to be governed by Boltzman statistics. Since the Boltzman distribution exhibits a nonlinear temperature dependence, the occupation of the various levels is also a nonlinear function of temperature. The gain of a rare-earth doped fiber at a certain wavelength is a summation over all possible transitions which produce emission at that wavelength, weighted by the temperature dependent probabilities of occupation. Consequently, the gain and ultimately, the spectrum of a rare-earth-doped fiber source are complex functions of temperature. The temperature dependence of a fiber source will now be examined for two types of active medium: Neodymium and Erbium.

Neodymium-Doped Fiber Sources

The simplest type of transition is the four-level laser transition which is well represented by the Nd:silica system. Pump photons are absorbed from the ground state to a much higher pump state. Relaxation occurs rapidly to a long lasting upper laser state. The laser transition occurs between this excited state and a lower laser state which should empty out rapidly back to the ground state. Because the lower laser state remains empty, signal absorption is not present in a four-level gain medium. The main thermal dependence of Nd:silica is therefore due only to variation in the occupation of the various levels that constitute the upper laser state. As temperature increases, higher energy levels of this manifold become more heavily occupied. Consequently, higher energy transitions to the lower laser level become more probable, which favors higher frequency, shorter wavelength emission. In the case of a fiber doped with Neodymium, the thermal variation most easily measured is the change in the spectrum measured at either end of the fiber which is an integration of the gain along the length of the fiber. Thus, the spectrum should shift to shorter wavelengths (higher frequency) as the fiber temperature increases. The thermal shift is often quantified in terms of the shift in mean wavelength in ppm/°C. Such a coefficient is a linear approximation of a nonlinear process and is therefore only strictly valid for small changes near the point of measurement. For Nd:silica, this coefficient is expected to have a negative sign when defined with respect to mean wavelength for either a resonant fiber laser (RFL) or a superfluorescent fiber source (SFS).

Erbium-Doped Fiber Sources

The three-level transition of Er:silica is considerably more complex than the four-level transition described for Neodymium. In such a system, the ground state and the lower laser state are combined into a single state. Hence, both the upper and lower laser levels remain occupied according to Boltzman statistics. Signal emission and signal absorption are both possible. These two processes are often separated by defining separate emission and absorption cross-sections which are weighted by the probabilities of occupation of the levels acting in each case. Emission occurs from the occupied lower levels of the upper laser state to the lower laser state while absorption occurs from the occupied lower levels of the lower laser state to the upper laser state. A plot of the emission cross-section is therefore shifted to lower frequencies (longer wavelengths) than the absorption cross-section. As temperature varies, the two processes are affected differently. As for the four-level laser, the emission shifts to shorter wavelengths with an increase in temperature. However, with an increase in temperature, higher levels of the lower laser state become more heavily occupied, which favors lower frequency, longer wavelength absorption. Therefore, the absorption shifts to longer wavelengths with an increase in temperature. The thermal variation observed in the spectrum emitted at either end of an Er-doped fiber is affected by both of these processes. Regions of the fiber with little inversion absorb heavily and produce a loss spectrum which shifts to longer wavelengths with increased temperature. Regions which are inverted produce gain and a spectrum which shifts to shorter wavelengths with increased temperature. As saturation becomes significant at higher power levels, many regions of the fiber have only a small net gain or loss but can act as filters that may shift either to longer or shorter wavelengths with temperature. The net shift observed at either fiber end is a complex function of pump power, pump wavelength and fiber length so that the coefficient could, in principle, take either a positive or a negative value. For an Er:silica superfluorescent fiber source, the shift observed in the forward and backward signals is not necessarily the same since the forward and backward spectra are not the same. For a resonant fiber laser or for a wavelength-swept fiber laser, the shift should be the same in both the forward and backward signals because, in these cases, it is the net round-trip gain which determines the emission wavelength.

Thermal Stability of the Preferred Embodiments

In a fibre gyroscope, the scale factor is affected by the source spectrum stability. A parameter which has been shown to be suitable to relate these two quantities is the average emission wavelength $<\lambda>$ or $\lambda$ bar, defined as:

$$\bar{\lambda} = \frac{\int_{\text{spectrum}} P(\lambda) \cdot \lambda \cdot d\lambda}{\int_{\text{spectrum}} P(\lambda) \cdot d\lambda} \tag{1}$$

where $P(\lambda)$ is the, power emitted between wavelengths $\lambda$ and $\lambda + d\lambda$. The variation of the mean wavelength is measured in parts per million (ppm). An inertial grade fiber gyroscope preferably needs a spectrum stability of about 1 ppm.

The mean wavelength is however in practice computed by dividing the spectrum into a large number, n, of discrete points and then using the following equation:

$$\bar{\lambda} = \frac{\sum_{i=1}^{n} P(\lambda_i) \cdot \lambda_i}{\sum_{i=1}^{n} P(\lambda_i)} \quad (2)$$

The mean wavelength is a useful quantity for representing the stability of a fiber source used in connection with a fiber-optic gyroscope (FOG). When the fiber source is used as the source of signals to be input in a fiber optic gyroscope, the scale factor of the FOG is determined by the mean of the fiber source spectrum. The mean wavelength of the spectrum produced by the superfluorescent fiber source can be measured using a swept-grating spectrum analyzer which divides the spectrum into a number of discrete points, for example, in 580 points.

The mean wavelength is a function of several variables. The most relevant variables are the following: the temperature, the power of the pump source or pump power, the wavelength of the light emitted by the pump source or pump wavelength and the length of the fiber. Other parameters also affect the mean wavelength such as the doping parameters, feedback and the fiber configuration. However, once a fiber has been selected, those variables do not vary much with the temperature and their contribution will be assumed to be negligible. Thus, the mean wavelength can be expressed by the following equation:

$$<\lambda_s> = \lambda(T, P, \lambda_p, L) \quad (3)$$

where
$<\lambda_s>$ is the mean wavelength of the signal;
T is the temperature;
P is the power of the pump source;
$\lambda_p$ is the wavelength of the light emitted by the pump source; and
L is the length of the fiber.

The above equation (1) becomes for small variations:

$$d<\lambda_s> = \frac{\delta<\lambda_s>}{\delta T} dT + \frac{\delta<\lambda_s>}{\delta P} dP + \frac{\delta<\lambda_s>}{\delta \lambda_p} d\lambda_p + \frac{\delta<\lambda_s>}{\delta L} dL \quad (4)$$

The variation of the mean wavelength with temperature is therefore given by the following equation:

$$\frac{d<\lambda_s>}{dT} = \frac{\delta<\lambda_s>}{\delta T)1} + \left(\frac{\delta<\lambda_s>}{\delta P)2}\right)\left(\frac{\delta P}{\delta T)3}\right) + \left(\frac{\delta<\lambda_s>}{\delta \lambda_p)4}\right)\left(\frac{\delta \lambda_p}{\delta T)5}\right) + \left(\frac{\delta<\lambda_s>}{\delta L)6}\right)\left(\frac{\delta L}{\delta T)7}\right) \quad (5)$$

with
index 1: P, $\lambda_p$, L constant;
index 2: T, $\lambda_p$, L constant;
index 3: $\lambda_p$, L constant;
index 4: T, P, L constant;
index 5: P, L constant;
index 6: T, $\lambda_p$, P constant;
index 7: $\lambda_p$, P constant.

The indexes on the right hand side of each partial derivative indicate that those indexed values are constant. For example, the term $(\delta<\lambda_s>/\delta P)_{T, \lambda_p, L}$ is the variation of the mean wavelength with respect to the pump power, when the temperature, the pump wavelength and the length of the fiber are held constant. For editorial reasons, the indexes will not be used, but the person skilled in the art will recognize that a partial differential term with respect to a variable X is calculated for values of the other variables which are held constant.

The second factor of the fourth term of the differential equation (5) is small. Therefore, in a first approximation, the fourth term is negligible with respect to the other ones. The above differential equation (5) thus becomes (the indexes are omitted for clarity):

$$\frac{d<\lambda_s>}{dT} = \frac{\delta<\lambda_s>}{\delta T} + \left(\frac{\delta<\lambda_s>}{\delta P}\right)\left(\frac{\delta P}{\delta T}\right) + \left(\frac{\delta<\lambda_s>}{\delta \lambda_p}\right)\left(\frac{\delta \lambda_p}{\delta T}\right) \quad (6)$$

The method of the present invention uses this differential equation to minimize the total variation of the mean wavelength with respect to temperature. This equation will be referred as the governing equation. The thermal stability of a superfluorescent fiber source mean wavelength is determined by three contributions as expressed by the above equation. The first term is the intrinsic temperature dependence of the active medium which, in rare-earth doped superfluorescent fiber sources, is mainly the result of variation in the Boltzman distributed occupation of the relevant laser levels. For example, this dependence is about $-10$ ppm/°C. in Nd:silica superfluorescent fiber sources. The second term is the pump power dependence and is the product of two factors: the first factor is the pump power level dependence of the spectrum and the second factor is the pump thermal dependence. Finally, the third term is a contribution that arises from the dependence of the emission wavelength on the pump wavelength (first factor) and the temperature dependence of the pump wavelength (second factor). Throughout this specification, the first, second and third terms will relate to the terms of the governing equation in the order described above. Since both pump power and pump wavelength may vary rapidly with temperature, the second and the third terms can be quite significant. It should be noted that, in a diode laser pump source, age and temperature effect the pump parameters. For example, the pump mean wavelength coefficient of a diode laser pump source is about $-400$ ppm/°C. All three terms will be assessed below for Erbium-and Neodymium-doped silica superfluorescent fiber sources.

The principle of the present invention is therefore to minimize the temperature dependence of the mean wavelength by using the governing equation and optimizing the values of the pump power and the pump wavelength so that the three contributions in the governing equation cancel each other.

Description of a First Preferred Embodiment of the Present Invention Using an Erbium-Doped Fiber FIG. 1 illustrates an exemplary embodiment of the present invention which can be advantageously used as a light source for a gyroscope as described in more detail hereinbelow. As illustrated, the fiber source 100 comprises an optical fiber 110 that is preferably a single-mode optical fiber In the embodiment shown in FIG. 1, the fiber 110 is formed of a silica glass that is doped with Erbium (Er) which emits output light at one or several emission wavelengths in response to a pump optical signal at a selected pump wavelength. For example, the optical fiber 110 may be doped with a concentration of Erbium in the range of 50 ppm to 2000 ppm. The optical fiber 110 of FIG. 1 is a conventional telecommunications type of optical fiber of $SiO_2$, doped with approximately 1600 ppm of Erbium. The optical fiber 110 used in the embodiment shown in FIG. 1 may be co-doped with Aluminum and Phosphorus. The exemplary optical fiber 110 has a core radius of approximately 2.2 microns and a cladding diameter of approximately 80 microns. The aperture number NA of the fiber shown in FIG. 1 is 0.2. Although an Erbium-doped optical fiber is preferable in the present invention, the optical fiber 110 can be doped with another suitable lasing material as described in more detail hereinafter for a Neodymium-doped fiber. The optical fiber 110 used in the embodiment of FIG. 1 is manufactured by AT&T Bell Lab, New Jersey. Other optical fibers are readily available, such as Erbium-doped fibers manufactured by GTE Inc.

The optical fiber 110 can absorb light at a multiplicity of absorption wavelengths. For example, at the absorption wavelength of 650 nm ($Ar^+$ pump DCM dye laser), the rate of absorption is 5 dB/m for an Erbium-doped fiber having a concentration of 300 ppm of Erbium (see Mears article, "High-gain rare earth doped fiber amplifier at 1.54 nm"). When pumped with an optical signal at a pump wavelength in the absorption range of Erbium which is in the range of 500 nm to 1500 nm, at a sufficient intensity of the pump radiation, the Erbium doping emits light in an emission range of approximately 1528 nm to approximately 1580 nm, depending upon the pump wavelength and the pump intensity, as will be discussed more fully below. More specifically, the absorption peaks of Erbium are near 528 nm, 650 nm, 800 nm, 980 nm and 1490 nm. There are two peaks of emission at 1533 nm and 1559 nm. There is an additional emission of light at 1580 nm but such emission has a substantially lower intensity.

The optical fiber 110 has a first end 112 and a second end 114. A first end portion 116 of the optical fiber 110 proximate to the first end 112 may be enclosed within a first capillary tube 118 to provide support for the first end portion 116 and to provide a means for accurate alignment of the first end portion 116. Similarly, a second end portion 120 of the optical fiber 110 proximate to the second end 114 may be enclosed within a second capillary tube 122. Both the first end 112 and the second end 114 are ground and polished so as to define planar surfaces 124, 126 inclined at an angle greater than 10°, e.g., in the embodiment of FIG. 1, at approximately 15° with respect to the transversal axis of the first end portion 116 and the second end portion 120, respectively. The planar surfaces 124 and 126 guarantee no reflection and hence no resonant structure. In the embodiment of FIG. 1, the planar surfaces 124, 126 minimize reflections estimated to be at a −60 dB level. The proximal end of the first capillary tube 118 is ground and polished at the same time as the first end 112 of the optical fiber 110 so that the proximal end of the first capillary tube 118 is coplanar with the planar surface 124. Similarly, the distal end of the second capillary tube 122 is ground and polished at the same time as the second end 114 of the optical fiber 110 so that the distal end of the second capillary tube 122 is coplanar with the planar surface 126. This arrangement is referred to as single-pass. Other arrangements are possible, in which one end surface of the fiber is perpendicular to the axis of the fiber. Such arrangements are referred to as double-pass because the signal emitted by the fiber is partially (about 4%) reflected by the end surface and passes twice through the gain medium of the fiber before being output. In a double pass arrangement, one of the end surfaces is precisely ground and polished so that it defines a flat planar surface substantially perpendicular to the longitudinal axis of the end portion of the fiber. Typically, the end portion of the optical fiber is enclosed within a first capillary tube to provide support for the end portion and to provide means for accurate alignment of the end portion of the fiber. The end of the capillary tube is ground and polished at the same time as the end portion of the optical fiber so that the end of the capillary tube is coplanar with the flat surface of the end portion. When the planar surface of the proximal end is perpendicular to the axis of the fiber and the planar surface of the distal end is inclined to an angle, the forward signal emitted by the fiber can exit the fiber through the distal end. This is referred to as a forward double pass device. Reciprocally, when the planar surface of the proximal end is inclined to an angle and the planar surface of the distal end is perpendicular to the axis of the fiber, the backward signal can exit the fiber through its proximal end. This is referred to as a backward double pass. In a single pass arrangement, two signals exit the fiber, the forward signal and the backward signal. The position of the detector near the proximal end or the distal end of the fiber determine whether it is a backward or a forward single pass. In the embodiment of FIG. 1, the detector 150 is located near the proximal end 112 of the fiber 110, making this embodiment of FIG. 1 a backward single pass arrangement.

The optical fiber 110 at the concentration mentioned above has a length that is preferably greater than 0.5 meter and which may be increased to any length. The length of the fiber can be varied in accordance with the concentration of dopant. In the embodiment shown in FIG. 1, the length of the optical fiber is approximately 2.4 meters. Spectral properties of the output signal are substantially altered for greater lengths. The fiber length of the fiber 110 in FIG. 1 is longer than the optimal length for generating forward signal power for all pump power levels considered. This extra length serves three main purposes. First, the length of fiber beyond optimal produces signal absorption which reduces round trip gain and prevents accidental resonant lasing. Second, this length guarantees the absorption of more than 99% of the pump power across the entire pump band from 955 nm to 995 nm. Finally, since the backward signal is the desired output, a greater length for the fiber 110 advantageously reduces the forward signal. Any photons emitted in the forward direction are not available for emission in the backward direction. The forward signal serves only to saturate the gain for the backward signal.

The fiber source 100 preferably includes a first mirror 128 that is mounted proximate to the first end 112 of the optical fiber 110. In the embodiment shown in FIG. 1, the mirror 128 is inclined at an angle of 45° with respect to the horizontal. The mirror 128 is advantageously a dichroic mirror having substantially 100% reflectivity at a first range of optical wavelengths, corresponding to the wavelengths of the pump signal, and having substantially no reflectivity at a second range of wavelengths, corresponding to the wavelengths of the emitted signal. The dichroic mirror 128 filters out the pump light from the output light to be detected. The structure of such a dichroic mirror is well known in the art.

The fiber source 100 of the present invention further includes an optical pump source 130. The pump source used in the embodiment of FIG. 1 is an Argon-ion pumped Ti:sapphire laser tunable across the entire pump band near 980 nm. Ti:sapphire lasers are readily available for experimental purposes. The pump band near 980 nm does not suffer from excited state absorption. Other available pump sources are, for example, a laser diode emitting at 1490 nm or at 980 nm. A laser diode emitting at 1490 nm is advantageous as the pump light wavelength is close to the output light wavelength. At this wavelength, there is also no excited state absorption, which increases the efficiency of conversion. A steryl-13 dye laser can also be used. This pump source emits radiation at a wavelength of 980 nm. Other pump sources can be selected that emit radiation at other wavelengths. For example, an Argon-ion laser emits radiation at 514 nm. This source, however, suffers from excited state absorption.

The optical pump source 130 generates a pump optical signal represented by an arrow 132 at a wavelength $\lambda_p$. The pump source and the pump wavelength are selected according to the method of the present invention.

The optical pump source 130 is aligned with respect to the dichroic mirror 128 and the longitudinal axis of the first end portion 116 of the optical fiber 110 so that the pump optical signal 132 is reflected on the first dichroic mirror 128 and is introduced into the first end portion 116 of the optical fiber 110 via the first end 112.

The pump optical signal 132 may be focused on the longitudinal axis of the first end portion 116 of the optical fiber 110 by a first lens 134, as illustrated in FIG. 1. In the embodiment shown in FIG. 1, the lens is a 18 x objective with a measured coupling efficiency of 47%. The lens working distance in the embodiment of FIG. 1 was selected to be long enough to keep the reflections into the fiber 110 below −50 dB.

The pump optical signal 132 introduced into the first end portion 116 propagates in the optical fiber 110 towards the second end 114. As the pump optical signal 132 propagates towards the second end 114, the optical energy of the pump optical signal 132 is absorbed by the Erbium doping ions of the optical fiber 110, causing the ions to change state. When the ions relax (i.e., return to their original stable state), photons are emitted at an emission wavelength that is longer than the pump wavelength. This emission effect is known to the art and has been used advantageously to produce superfluorescent broadband sources by pumping an Erbium-doped fiber with a pump optical signal of sufficient intensity to cause spontaneous emission in a random manner so as to provide an output signal having a low temporal coherence. See, for example, U.S. Pat. No. 4,637,025. This patent is hereby incorporated by reference herein. Such superfluorescent broadband sources are specifically constructed so that the emitted light passes directly out of the first end or the second end of the optical fiber. Such superfluorescent broadband sources do not operate in the same manner as resonant cavity lasers.

In the embodiment of FIG. 1, some of the spontaneously emitted light is initially directed toward the first end 112 of the optical fiber 110. This emitted light is referred to as the backward signal. Some of the spontaneously emitted light is also directed toward the second end 114 of the fiber. This emitted light is referred to as the forward signal.

The backward signal exits the first end 112 of the optical fiber 110, passes through the dichroic mirror 128 and is collected by the detector 150. In order to filter out any pump light that may be present in the output beam, the detector 150 may also comprise an optical filter 152 such as a gallium arsenide wafer.

Figure 2:
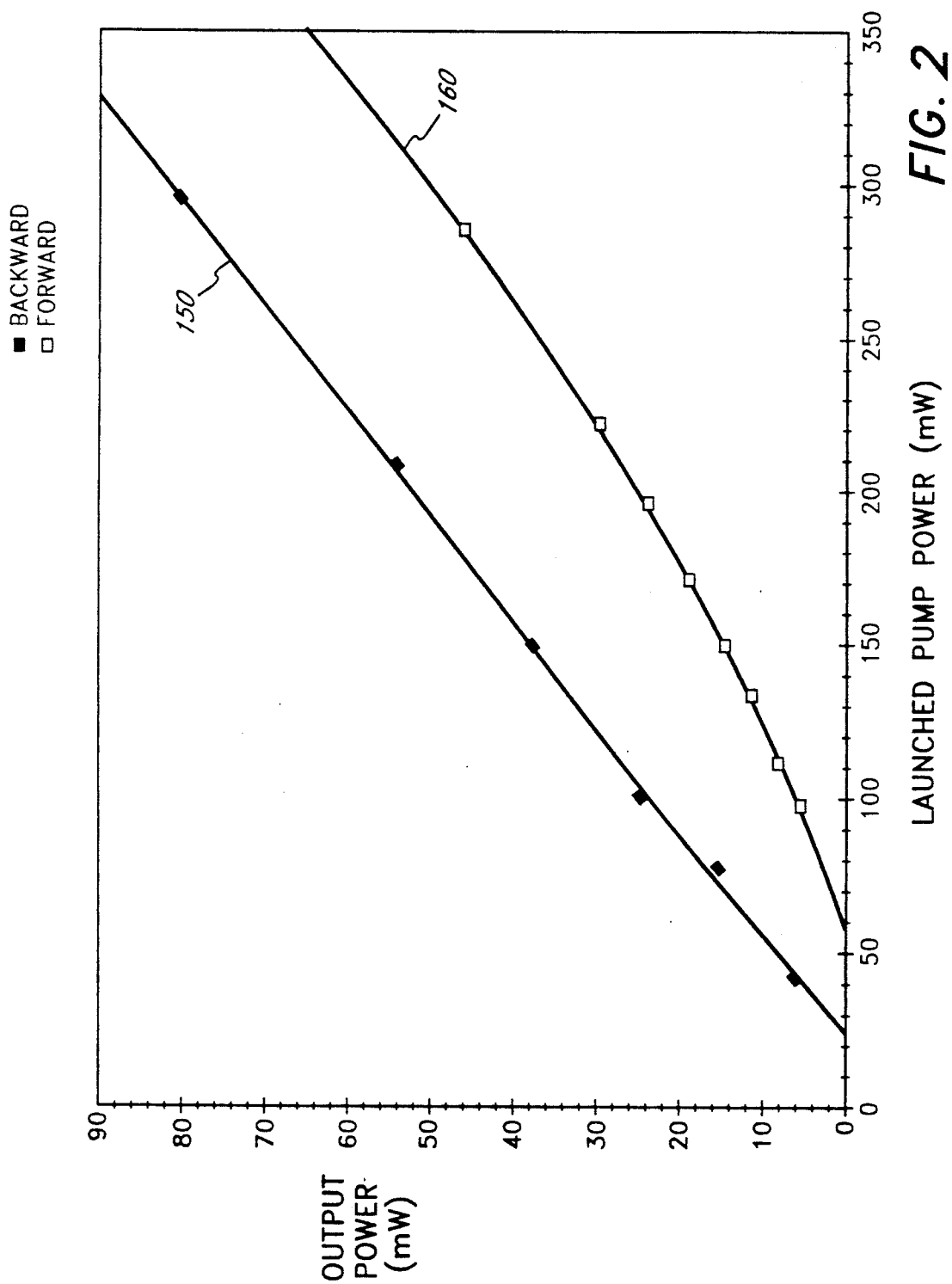
FIG. 2 is a graph of the power output in the forward power and the backward directions versus the pump power for the broadband source of FIG. 1 wherein the fiber is 2.4 m long, the Erbium concentration is 1600 ppm and the pump wavelength is approximately 980 nm.

Reference is now made to FIG. 2 which illustrates the output power of the source 100 versus the power of the pump source launched into the fiber 110 in both the backward direction (curve 150) and the forward direction (curve 160). The horizontal scale in the graph of FIG. 2 is the launched pump power in milliwatts and the vertical scale is the output power in milliwatts. In the embodiment of FIG. 1, the pump source emits at a wavelength of approximately 980 nm. The threshold power levels are 22 mW and 100 mW for the backward and forward directions respectively. In the high power limit, both curves 150 and 160 are quasi linear with slopes of 30% and 22% for the backward and forward waves respectively. The sum of the slopes of the curves corresponding to the backward and the forward direction, i.e., 52%, indicates the efficiency of the fiber source. The upper limit of this sum is the ratio of the signal wavelength (i.e., 1550 nm) to the pump wavelength (i.e., 980 nm). This ratio is referred to as the quantum limit. In the embodiment of FIG. 1, the quantum limit is 63% (i.e., the ratio between 980 over 1550). The quantum efficiency of the configuration of FIG. 1 is therefore 82%, i.e., 52/63. The maximum power produced by the source is over 80 mW in the backward direction. The curves of FIG. 2 have been plotted for a single pass configuration. The launched pump power varies between the threshold power, 22 mW for the backward direction and 60 mW for the forward direction up to a few hundreds milliwatts, approximately 350 mW. The output power varies between 0 mW at the threshold level up to approximately 80 mW and 50 mW for a pump power of 300 mW for the backward and the forward directions respectively. The curves 150 and 160 are quasi linear, particularly for higher pump powers.

At pump power levels near threshold, the double-pass configuration would produce considerably more power than the single-pass, especially since no output is wasted in the unused direction. At higher pump levels the difference is less substantial because saturation limits the total output from both ends of the fiber to approach the quantum limit in both cases. Despite the difference in output power between single pass devices and double pass devices, single pass configurations are preferable, because doublepass devices are far more prone to accidental resonant lasing. In a double pass device, any spurious reflection from the source end optics or the optical system itself can make the roundtrip gain exceed unity. The single-pass, either backward or forward configuration is least susceptible to lasing because one fiber end is unused.

Figure 3:
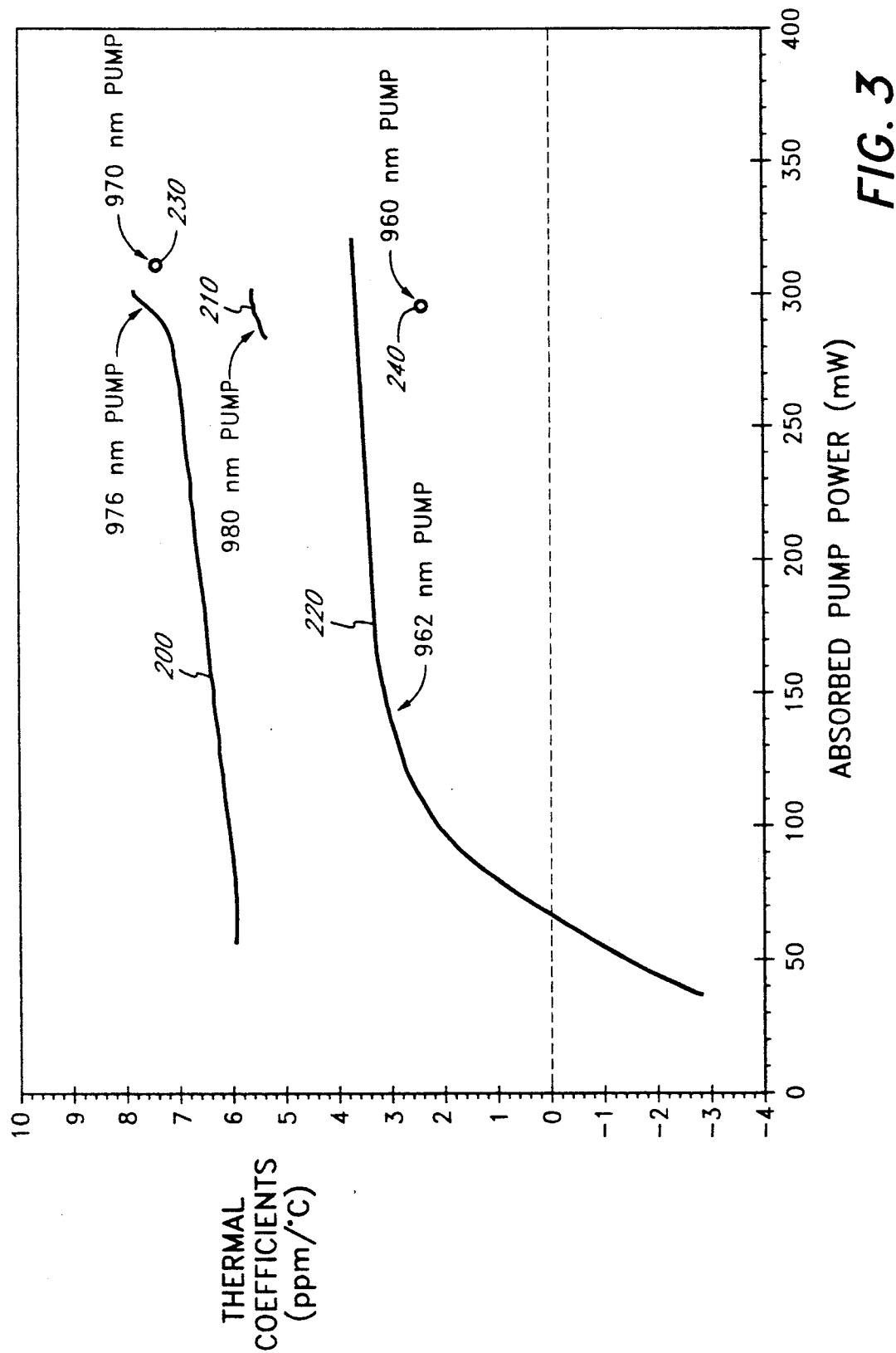
FIG. 3 is a graph of the intrinsic thermal coefficient in ppm/°C. measured for 5° C. change from 25° C. to 75° C. for various pump wavelengths and pump power levels for the embodiment of FIG. 1 operated in backward-signal, single-pass configuration.

Reference is now made to FIG. 3 which is a plot of the intrinsic thermal coefficient of the optical fiber in ppm/°C. as a function of the pump power for various pump wavelengths. The intrinsic thermal coefficient is the first term of the governing equation, i.e., $(\delta<\delta_s>/\delta T)$. The graph of FIG. 3 show the dependency of the intrinsic thermal coefficient versus the pump power for the following values of the pump wavelength: 976 nm (curve 200), 980 nm (curve 210) and 962 nm (curve 220). Only one point is given for the wavelength of 970 nm (point 230, for a pump power of approximately 300 mW) and another point for the wavelength of 960 nm (point 240, for a pump power of approximately 280 mW).

The intrinsic thermal stability can be analyzed by cycling the temperature of the fiber repeatedly in a range of temperature. For example, in the embodiment of FIG. 1, the temperature is varied repeatedly between 25° and 75° C. The measurement system may comprise a temperature controlled enclosure surrounding the optical fiber to cycle the fiber temperature between 25° C. and 75° C. in less than one minute, a scanning monochrometer with a 0.1 nm resolution and a computer to control the monochrometer as well as to record and to process the data. In the embodiment of FIG. 1, approximately 1/10 meter of the input end of the fiber was outside the enclosure for input and output coupling purposes and was consequently not heated.

The measured change is then averaged. For all sets of conditions tested for the 2.4 m fiber of the FIG. 1 embodiment, the measured spectra are in excess of 20 nm in width, which far exceeds any fiber optic gyroscope requirements. The accuracy of these measurements is estimated as $\pm 2$ ppm/°C. The coefficients are small and positive in most cases. In the three-level Erbium transition, both the upper and lower laser levels are occupied depending on the inversion at a given point along the fiber. The signal emission spectrum shifts to shorter wavelengths but the signal absorption spectrum shifts to longer wavelengths as temperature increases. The thermal coefficient is therefore different at different points along the fiber. When integrated along the fiber, the net signal observed in the backward direction can have either a positive or a negative thermal coefficient. For high power, highly saturated cases, the result tends to be positive.

Referring again to FIG. 3, the curve 200 (for a pump wavelength of 976 nm) exhibits a slow variation over the range of pump powers, with only a net increase of the thermal coefficient at higher pump powers. The thermal coefficient varies between 6 and 8 ppm/°C. In contrast to the curve 200, the curve 220 (for a pump wavelength of 962 nm) drops substantially for lower pump powers. The thermal coefficient becomes zero for a pump power of about 50 mW and negative for pump powers less than 50 mW. At higher values of the pump power, the curve 220 is similar to the curve 200 and substantially parallel to it. The thermal coefficient then varies between 3 and 5 ppm/°C.

In summary, the intrinsic dependence is generally positive and becomes greater with an increase in pump power as fiber saturation becomes more significant. The coefficients are larger near the peak pump absorption wavelength of 976 nm (curve 200) than away from this peak at 962 nm (curve 220), even though substantially all pump power is absorbed in both cases. At 976 nm (curve 200), pump power is absorbed more rapidly, which leads to greater saturation. The positive sign of the intrinsic thermal coefficient suggests that the shift of the absorption spectrum in the regions of the fiber with little inversion is of greater significance than the shift in emission for the inverted regions.

Figure 4:
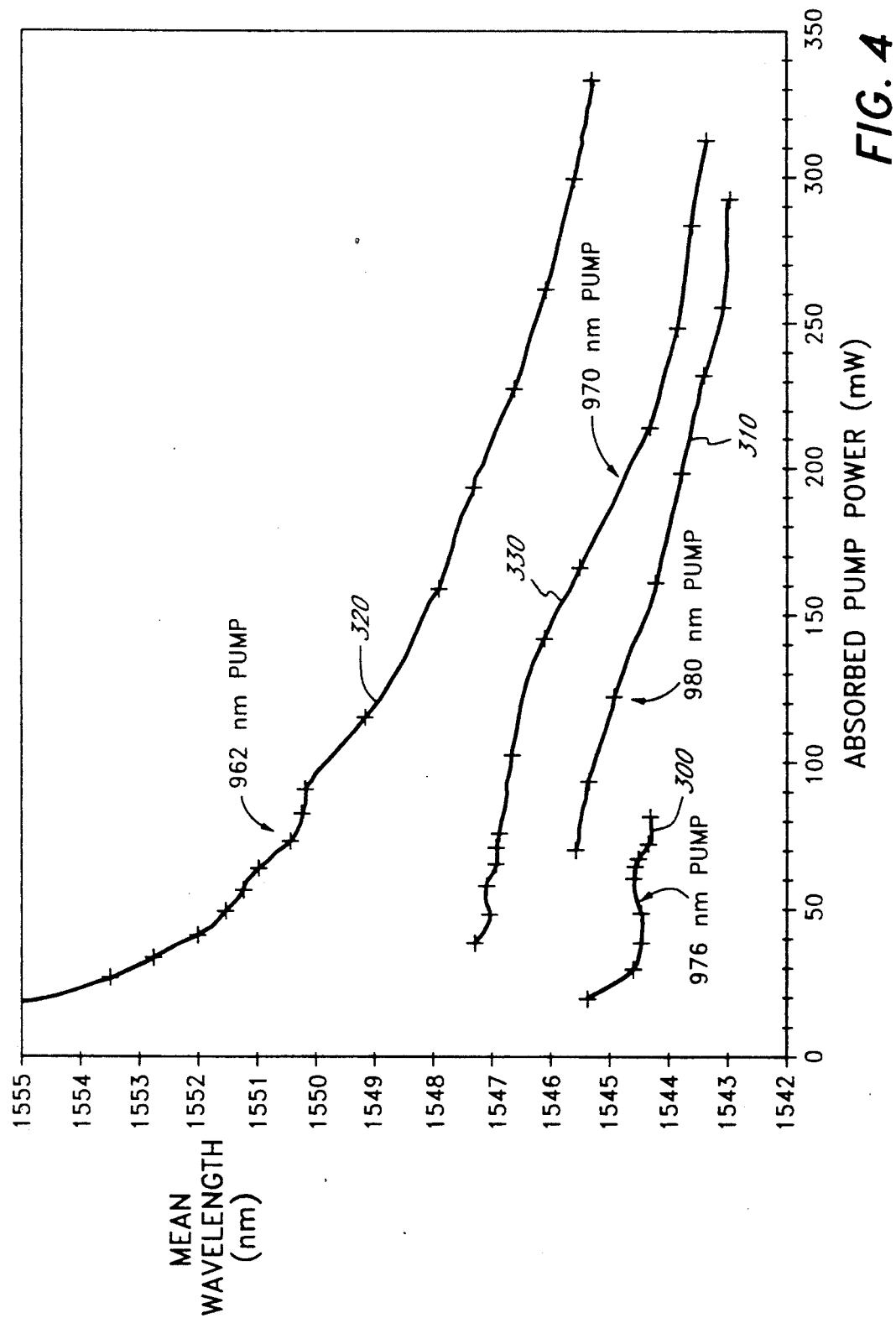
FIG. 4 is a graph of the mean wavelength versus the absorbed pump power for various pump wavelengths for the embodiment of FIG. 1.

Reference is now made to FIG. 4 which represents the mean wavelength as a function of the pump power. This variation corresponds to the term $\delta<\lambda_s>/\delta P$ in the governing equation. This dependence is calculated by varying the pump power for various pump wavelengths and measuring the mean signal wavelength. The mean wavelength versus the pump power is plotted for different values of the pump wavelength, namely the values of the pump wavelengths used in FIG. 2, with the exception of 960 nm. These values are: 962 nm, 970 nm, 976 nm and 980 nm. The corresponding curves are respectively designated by the numerals: curve 300 for 976 nm, curve 310 for 980 nm, curve 320 for 970 nm, and curve 330 for 970 nm. The pump power is varied between 0 and 350 mW and the mean wavelength can take values between 1543 nm and 1555 nm. Most of the curves in FIG. 4 have negative slopes because additional pump power leads to inversion in more regions of the fiber. This makes signal absorption less effective and favors the emission peak which is at shorter wavelengths. In many regions of these curves, the dependence is substantial. For example, the slope of the curve 320 around 50-100 mW is approximately $-13$ ppm/mW. More generally, the pump power dependence of FIG. 4 exhibits slopes between 0 nm/mW (0 ppm/mW) and $-0.144$ nm/mW ($-93$ ppm/mW) with a typical slope being nearer to $-0.01$ nm/mW ($-7.0$ ppm/mW). The negative slope is expected since additional power absorbed in the fiber should create some increase in net inversion. This favors the peak of the fluorescence curve which is at shorter wavelengths than the mean. However, certain regions of the curves also exhibit flat variations. For example, when pumping with approximately 70 mW at the peak pump absorption wavelength near 976 nm, the rightmost portion of the curve 300 becomes almost flat. This suggests that, for certain conditions, pump power control to 1 mW may be adequate to keep the contribution of the pump power dependence below 1 ppm.

Figure 5:
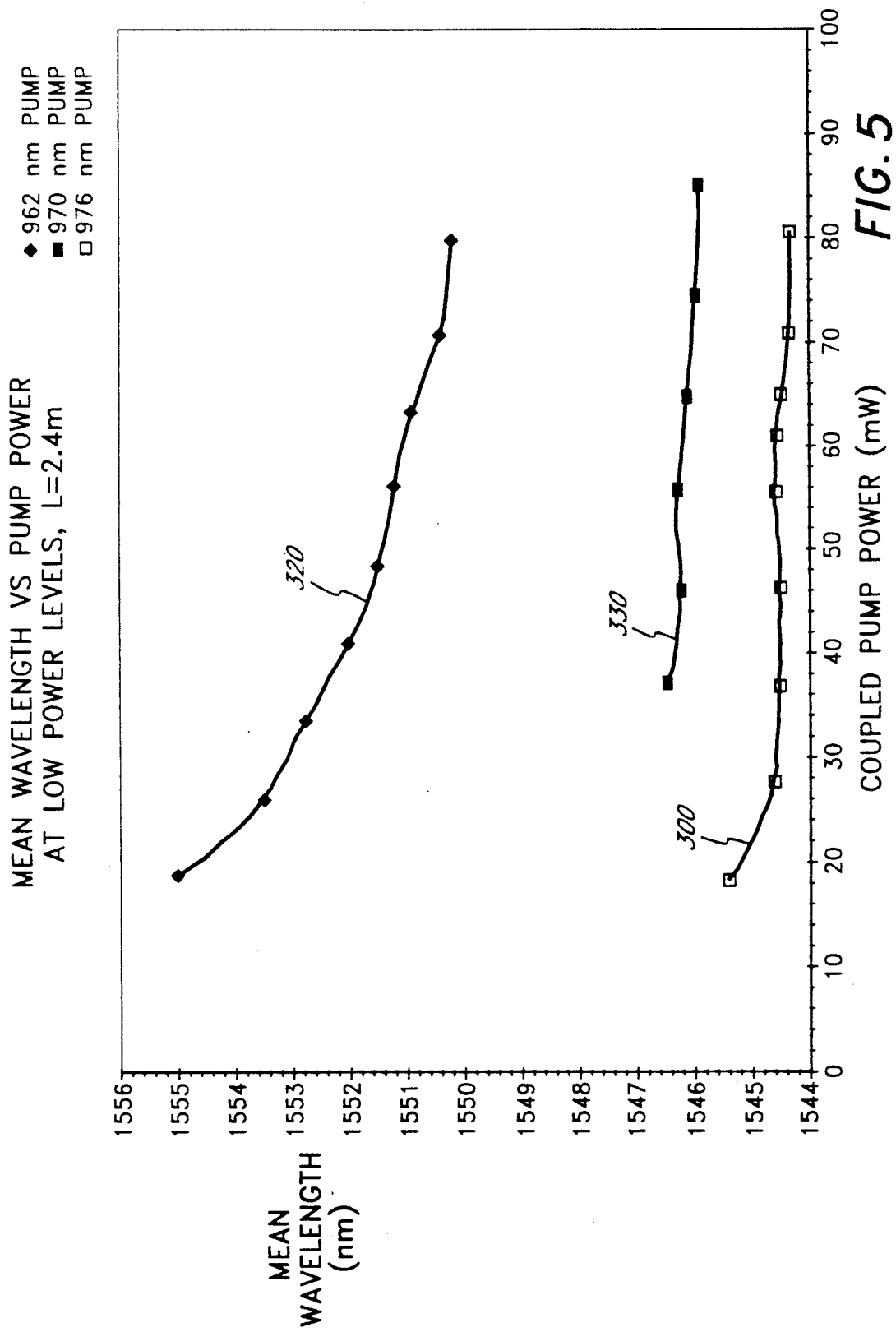
FIG. 5 is an expanded portion of the graph of FIG. 4 for low values of the pump power.

FIG. 5 is similar to FIG. 4 and represents the dependence of the mean wavelength versus the pump power for values of the pump power between 0 and 100 mW. Because FIG. 5 expands the portion of FIG. 4 in the pump power range of 20-90 mW, the flat portions of the curves 300, 320 and 330 appear more visibly. The curve 330 is not represented in FIG. 5.

Figure 6:
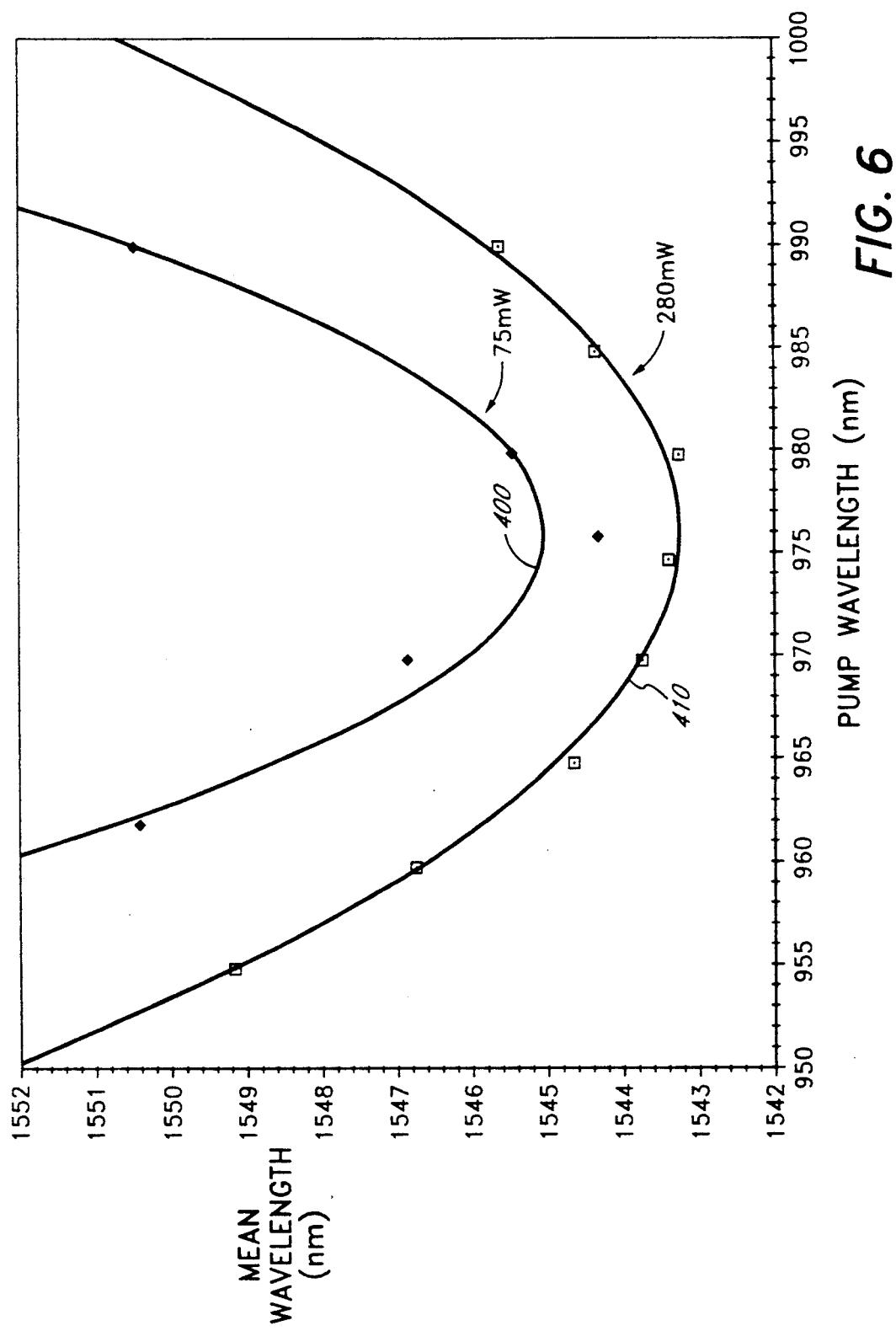
FIG. 6 is a graph of the mean wavelength versus the pump wavelength for two pump power levels.

Reference is now made to FIG. 6, which represents a plot of the mean wavelength versus the pump wavelength (third term, $(\delta<\lambda_s>/\delta P)$, in the governing equation). This dependence can be calculated by varying the pump wavelength, while maintaining the pump power, and measuring the mean wavelength. Two curves only 400 and 410 are plotted in FIG. 6, corresponding respectively to two pump power levels, 75 mW and 280 mW. Both curves 400 and 410 are nearly symmetrical with a minimum at the peak pump absorption wavelength of 976 nm. They can be fit by parabolas to illustrate roughly the form of the dependence near the minimum. The symmetry of the curves indicates that the pump absorption rate controls the spectrum. Since the pump absorption rate is roughly symmetrical about the peak, pumping at wavelengths equidistant from the peak, produces the same spectrum and hence the same mean wavelength. The symmetry of the curves 400 and 410 can therefore be explained by the fact that Erbium is substantially homogeneously broadened. All absorbed pump photons are apparently equivalent as far as signal evolution is concerned. Rapid pump absorption favors the shorter wavelengths because it provides more power per unit length in the most critical regions of the fiber. This again creates greater inversion and favors the shorter wavelength emission spectrum. The slope of the curves 400 and 410 is approximately 0 nm/nm at 976 nm but can be as much as 0.525 nm/nm with either sign at other values of the pump wavelength. When combined with the typical diode dependence, this gives a range from −100 ppm/°C. to +100 ppm/°C. for the contribution of the third term of the governing equation.

Using the parabolic fit for the 300 mW curve, operation at the minimum would require temperature stabilization to 0.62° C. to keep the variation to 0.5 ppm (assuming a pump variation of 400 ppm/°C.). Varying the pump wavelength from 960 nm to 976 nm makes less than 20% change in the output power in the backward direction. As long as all pump photons are absorbed, they are available for emission from either end of the fiber.

Methods of the Present Invention in Connection with an Erbium-Doped Fiber Source The method of the present invention ideally consists in plotting the graph of the mean wavelength as a function of the pump wavelength, the temperature and the pump power in a four dimensional space. Since this is not actually feasible in practice, a set of three dimensional plots of the following plots can be drawn: the mean wavelength as a function of the temperature and the pump power, the mean wavelength as a function of the temperature and the pump wavelength and the mean wavelength as a function of the pump power and the pump wavelength. For example, the first plot representing the dependence of the mean wavelength as a function of the temperature and the pump power is drawn for a number of values of the third variable, namely the pump wavelength. The same applies for the other two types of plots. The next step consists in locating all the extrema (i.e., minima, maxima and saddle points) for each of those plots. Finally, the extrema of the four dimensional plot are determined by the intersection of the sets of minima and maxima found in the three dimensional plots.

The method described above is computer intensive but can lead to the determination of all the extrema in the four dimensional plot. The calculation of the extrema can be facilitated by the fact that the first term of the governing equation is substantially constant across a range of values of the pump power, as illustrated in FIG. 3. In FIG. 3, the value of the first term (the intrinsic thermal coefficient) is approximately in the range of 6–8 ppm/°C. for values of the pump power varying between 100 and 300 mW and for pump wavelengths around 976 nm. For lower values of the pump wavelength and for the same range of pump powers, the intrinsic coefficient is approximately between 3 and 4 ppm/°C. Because the first term of the governing equation remains constant over a wide range of values of the other two variables, only a few three dimensional plots may be necessary to determine the extrema of the four dimensional plot.

Figure 7:
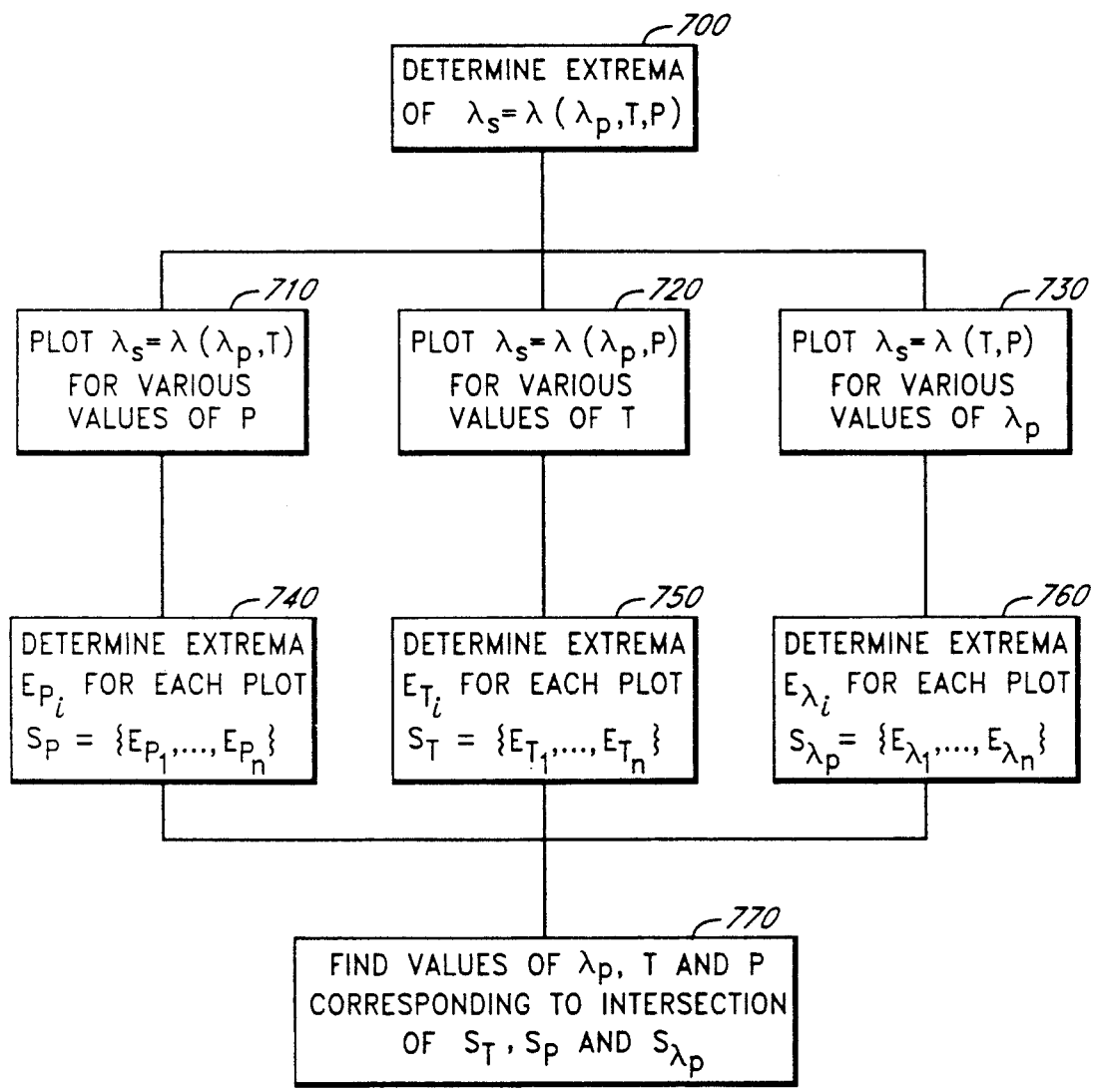
FIG. 7 is a flowchart illustrating the main steps of the method of the present invention so as to determine the extrema of the signal wavelength as a function of the pump power, the temperature and the pump power with respect to the temperature.

Reference is now made to FIG. 7 which summarizes the steps of the method of the present invention in a flowchart. The initial step 700 defines the object of the present invention, namely determining the extrema (i.e. the maxima, the minima and the saddle points) of the curve $<\lambda_s> = \lambda (T, P, \lambda_p)$, i.e. the mean wavelength as a function of the temperature, the pump power and the pump wavelength. In each of the next steps 710, 720 and 730, plots are drawn for each function of two of the variables only. For example, in the step 710, plots of the function $<\lambda_s> = \lambda (T, \lambda_p)$, i.e., the mean wavelength as a function of the pump wavelength and the temperature are drawn for a number of values of the pump power. This is done for the other variables, *mutatis mutandis*. The plots obtained in the steps 710, 720 and 730 are three dimensional plots. In the next steps 740, 750 and 760, the maxima and the minima for each of those plots are determined. Finally, in the final step 770, the sets of maxima and minima obtained are intersected to find the minima and the maxima corresponding to the initial function represented in step 700. Once all the extrema of the function $<\lambda_s> = \lambda (T, P, \lambda_p)$ have been obtained, it may preferable to keep the maxima and minima which are stable, i.e., those for which the potential is minimum.

Because the above method is computationally intensive and requires a great number of measurements corresponding to each one of the sampling variables, it may be preferable to adjust the value of one of the terms of the governing equation to zero and minimize the value of the other two terms. Alternatively, the value of the sum of two of the terms can be adjusted to zero while the value of the third term is minimized.

In a first aspect of the method of the present invention, the first factor of second term of the governing equation, $(\delta<\lambda_s>/\beta P)$, i.e., the dependence of the signal wavelength versus the pump power, is adjusted to be zero or substantially close to zero.

Figure 8:
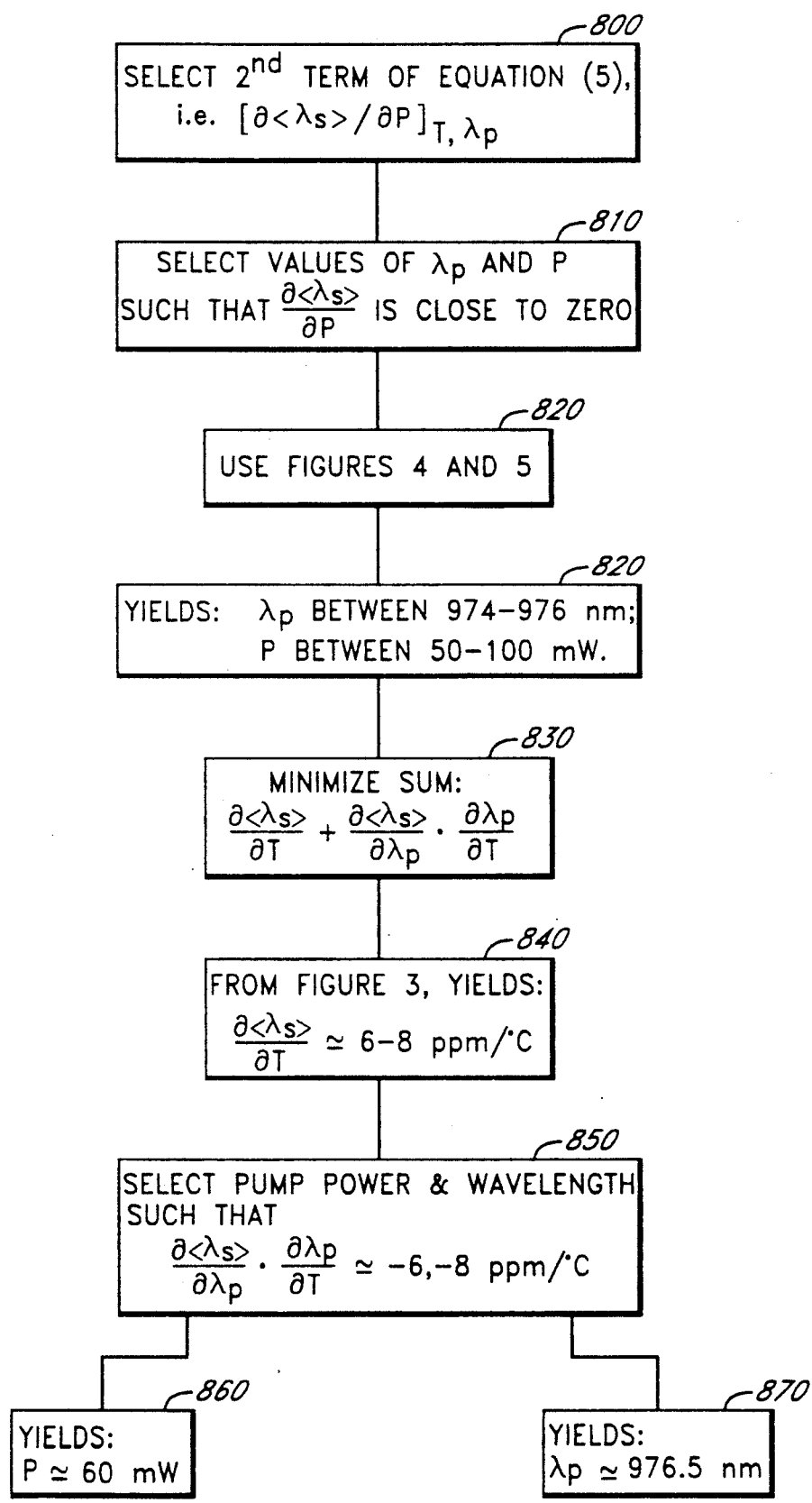
FIG. 8 is a flowchart illustrating the main steps of the present invention wherein the second term of the governing equation is equal to zero and the pump wavelength and the pump power are selected so as to minimize the other two terms of the governing equation.

Reference is made to FIG. 8 which is a flowchart illustrating the main steps of a preferred method of the present invention according to the first aspect. At the initial step 800, the second term of the governing equation is examined and selected so that it is as close to zero as possible. The second term is the product of two factors, the pump power dependence of the signal wavelength, $(\delta<\lambda_s>/\delta P)$, by the temperature dependence of the pump power. The latter term depends on the nature of the pump source and is given by the manufacturer. The former term is given in FIGS. 4 and 5 for different values of the pump wavelength. The only flat portion in the curves 300, 310, 320 and 330 is found in the curve 300 (corresponding to a pump wavelength of 976 nm) in the pump power range of 50–100 mW. This gives a first pump wavelength and a first range of powers. Other values of the pump wavelength and corresponding ranges of powers can also be determined if more curves were plotted in FIG. 4. FIG. 5, which is an expanded view of FIG. 4 in the lower power region shows the flat portion of the curve 300 more visibly. This step is summarized by the box 810 and the results are in the box 820. More precise calculations show that the pump wavelength can be selected in a range close to 976 nm but not equal to 976 nm in order to obtain a value of the second term as close to zero as possible. The step 810 leads to a set of values of the pump wavelength and the pump power that make the second term of the governing equation equal to zero.

The next step consists in minimizing the remaining two terms, namely $(\delta<\lambda_s>/\delta T) + (\delta<\lambda_s>/\delta\lambda_p)\cdot(\delta<\lambda_p>/\delta T)$, and preferably, adjusting that sum as near zero as possible (step 830). One option is to select the pump power and the pump wavelength such that the remaining two terms are equal and of opposed sign, making the sum equal to zero. For a value of the pump wavelength near 976 nm, the intrinsic thermal coefficient varies between 6 and 8 ppm/°C. FIG. 3 shows curves for the pump wavelengths at 976 nm, 980 nm and 962 nm in the upper pump power range. The dependence of the pump wavelength near 976 nm is expected to be quite similar to the one at the measured pump wavelengths (step 840). The last step consists in selecting an exact value of the pump wavelength such that the third term of the governing equation, $(\delta<\lambda_s>/\delta\lambda_p)\cdot(\delta<\lambda_p>/\delta T)$, varies between $-6$ and $-8$ ppm/°C. Like the second term, the third term is also a product of two terms. The first factor $(\delta<\lambda_s>/\delta\lambda_p)$ is given by the value of the slope of the curves in FIG. 6, whereas the second factor $(\delta\lambda_p/\delta T)$, i.e., the temperature dependence of the pump wavelength is provided by the manufacturer. Referring now to FIG. 6, it is possible to choose the pump wavelength dependence of the signal wavelength so that it is either positive or negative for a given pump wavelength. For example, near 976 nm, the slope of the curve 410 can either be positive (right portion of the curve 410) or negative (left portion of the curve 410). The ability to choose the sign of the slope of the curves in FIG. 6 allows one to compensate for the intrinsic thermal coefficient.

In the present case, for the type of fiber used in the experimental setup represented in FIG. 1, the pump power selected is equal to 60 mW. Near 976 nm, the intrinsic temperature dependence (first term of the governing equation) is approximately 6 ppm/°C. The typical laser diode has a pump wavelength temperature dependence of about $-300$ ppm/°C. If the wavelength dependence of the signal wavelength $(\delta<\lambda_s>/\delta\lambda_p)$ comes to the ratio $0.02\cdot[\lambda_s/\lambda_p]$, the multiplication of that term by $-300$ gives $-6$ ppm/°C., which annuls the intrinsic thermal coefficient. The ratio $[\lambda_s/\lambda_p]$ is necessary to convert the ppm unit into proper reference wavelength units, because the ppm unit is related to the mean wavelength. The step 850 consists in finding a power pump and a pump wavelength so that the slope of the curve that would be plotted in FIG. 6 would give $0.02\cdot[\lambda_s/\lambda_p]$ for that particular pump wavelength. In other terms, there is a point next to 976 nm where the desired cancellation of the three terms of the governing equation can be obtained. If the pump source is first operated at the peak absorption point for that fiber (here 976 nm), and moved upward slightly in pump wavelength, it will eventually reach a point where a zero net wavelength variation is obtained. In the present case, the optimal pump wavelength was found near 976.5 nm for a pump power of 60 mW (steps 860 and 870).

Practically, the second term is not exactly zero for the value of the pump wavelength found (976.5 nm). In a refinement of this method, the new value of the second term can be plugged into the governing equation in order to find more accurately the new value of the pump wavelength that annuls the net thermal wavelength variation.

According to another aspect of the present invention, the pump wavelength is selected so that the third term of the governing equation is zero. The first factor in the third term $(\delta<\lambda_s>/\delta\lambda_p)$ is then zero, independently of the value of the second factor of the third term, $(\delta\lambda_p/\delta T)$, which is simply provided by the manufacturer of the pump source. Reference is again made to FIG. 6 in which the mean wavelength is plotted against the pump wavelength. The slope of the curves 400 and 410 give the value of the coefficient $(\delta<\lambda_s>/\delta\lambda_p)$ for values of the pump power equal to 75 mW and 280 mW, respectively. For example for a pump power of 280 mW (curve 410), the term $(\delta<\lambda_s>/\delta\lambda_p)$ is zero for a pump wavelength equal to 976 nm. This term is also zero at 976 nm for a pump power of 75 mW (curve 400).

Once the third term is equal to zero, two options are possible in minimizing the temperature dependence given by the governing equation. The two other terms can be made as small as possible. Alternatively, the two first terms compensate each other or add to a very small value.

Assuming the pump wavelength that annuls the third term is very close to 976 nm, the intrinsic coefficient term given by the curve 200 is approximately between 6 and 7 ppm/°C. Thus the second term should be as close as possible to $-6$ or $-7$ ppm/°C. The second term is the product of two factors: $(\delta<\lambda_s>/\delta P)$ and $(\delta P/\delta T)$. The second factor $(\delta P/\delta T)$ is provided by the manufacturer and is negative for typical semiconductor sources. The first factor $(\delta<\lambda_s>/\delta P)$ is given by the slopes of the curves in FIGS. 4 and 5. Reference is now made to FIG. 5. In FIG. 5, the slope of the curve 300 varies from negative values to positive values. It is therefore possible to select a pump power such that the second term is negative and approximately equal to 6 or 7 ppm/°C. in absolute value. This last step allows to select the optimal pump power for a set of optimal wavelengths.

According to another aspect of the present invention, the first term of the governing equation, i.e., the thermal coefficient is selected to be zero. Reference is made to FIG. 3 which represents several plots of the thermal coefficient. Only one of the curves represented in FIG. 3 crosses the x-axis, namely the curve 220 for a pump wavelength of 962 nm and for a pump power of approximately 70 mW. The power of the pump source is therefore relatively low. These two values of the pump power and the pump wavelength determine the second and the third terms using the curves of FIGS. 4, 5 and 6.

Figure 9:
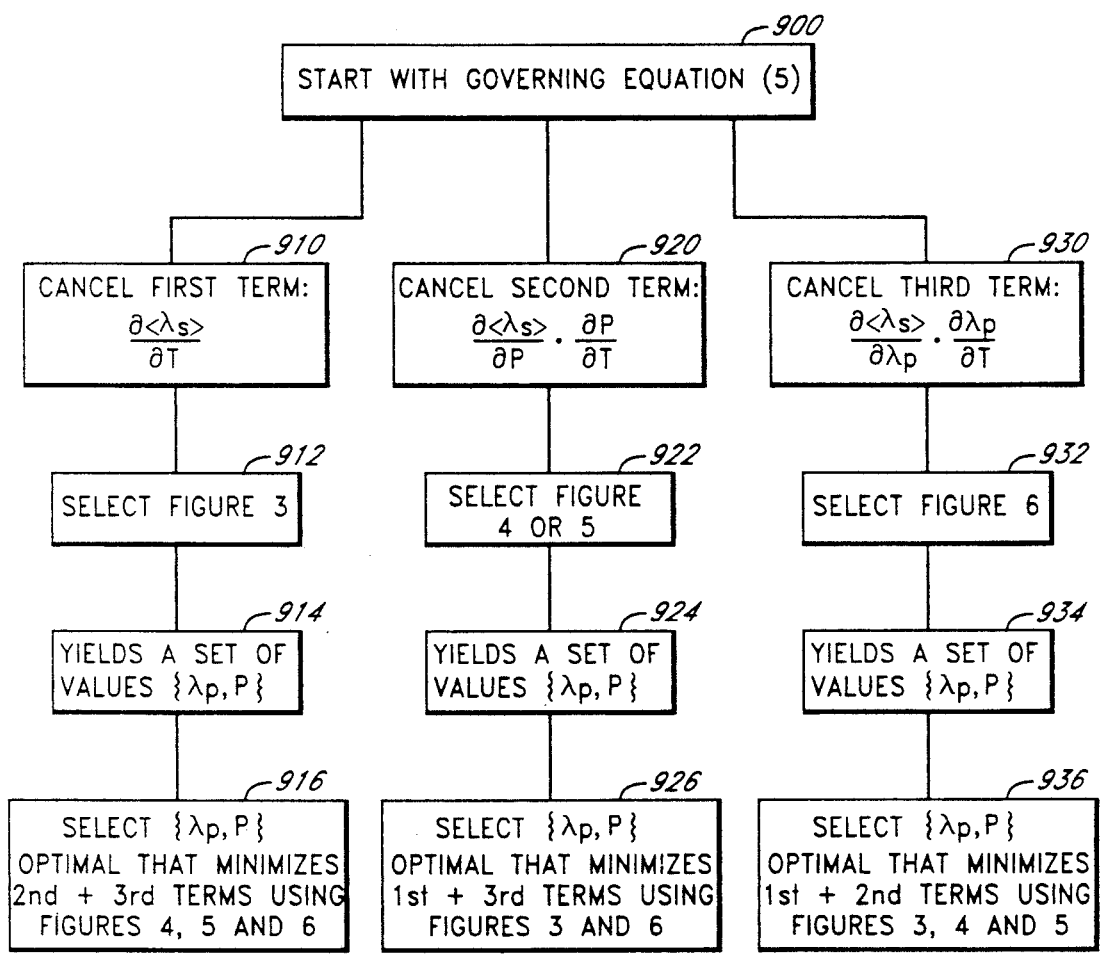
FIG. 9 summarizes steps of the method of the present invention wherein one of the terms of the governing equation is zero and wherein the pump power and the pump wavelength are selected such that the sum of the other two terms is either zero or as small as possible.

The methods described above are summarized in a flowchart in FIG. 9. The first step 900 consists in considering the governing equation, which comprises three terms. Three options are possible. In a first step 910, the first term is selected to be zero. FIG. 3 (step 912) produces a set of values of the pump wavelength and the pump power for which the curves cross the x-axis (step 914). In the case of FIG. 3, only one curve fulfills that condition. However, other curves for other values of the pump wavelength may be possible (for example, for a value of the pump wavelength close to 962 nm, such as 963 nm, not represented in FIG. 3). Once a set of pairs $\{\delta_p, P\}$ is obtained, FIGS. 4, 5 and 6 are used to select the optimal pair $\{\lambda_p, P\}$ that minimizes the sum of the second and the third terms (step 916). This can also be done for the other terms. Different figures are used to determine the set of values $\{\lambda_p, P\}$ that cancels one of the terms and the optimal value (or possibly the optimal values) that minimize the sum of the remaining terms. For example, either the second term (step 920) or the third term (step 930) can be made equal to zero by selecting FIGS. 4, 5 or FIG. 6 respectively (steps 922 and 932). A set of pairs $\{\lambda_p, P\}$ is obtained in either case (steps 924 and 934). The next steps consist in selecting the optimal pair $\{\lambda_p, P\}$ that minimizes the sum of the remaining terms (steps 926 and 936).

In the methods described above, all the measurements are made at room temperature that is supposed to be constant and equal to 25° C. The coefficients obtained in FIGS. 4, 5 and 6 would be different at other temperatures.

The temperature dependence obtained by the method of the present invention is extremely low, approximately 5 to 10 times better than the temperature dependence expected without careful selection of the pump parameters under the best experimental conditions. For example, thermal variations of about 1 ppm/°C. can be obtained by applying the method of the present invention.

It can be noted that the power of the pump is less controllable that the emission wavelength of the pump source. For example, in the case of a diode, the pump power may vary with the age of the diode. This would indicate that better results are obtained by cancelling the second term of the governing equation, i.e., by varying the pump wavelength rather than the pump power.

Description of Another Preferred Embodiment and Method of the Present Invention Using a Neodymium-Doped Fiber The method of the present invention is applicable to any rare earth-doped fiber source. For example, the principle of the present invention is also valid in the case of Neodymium.

Figure 10:
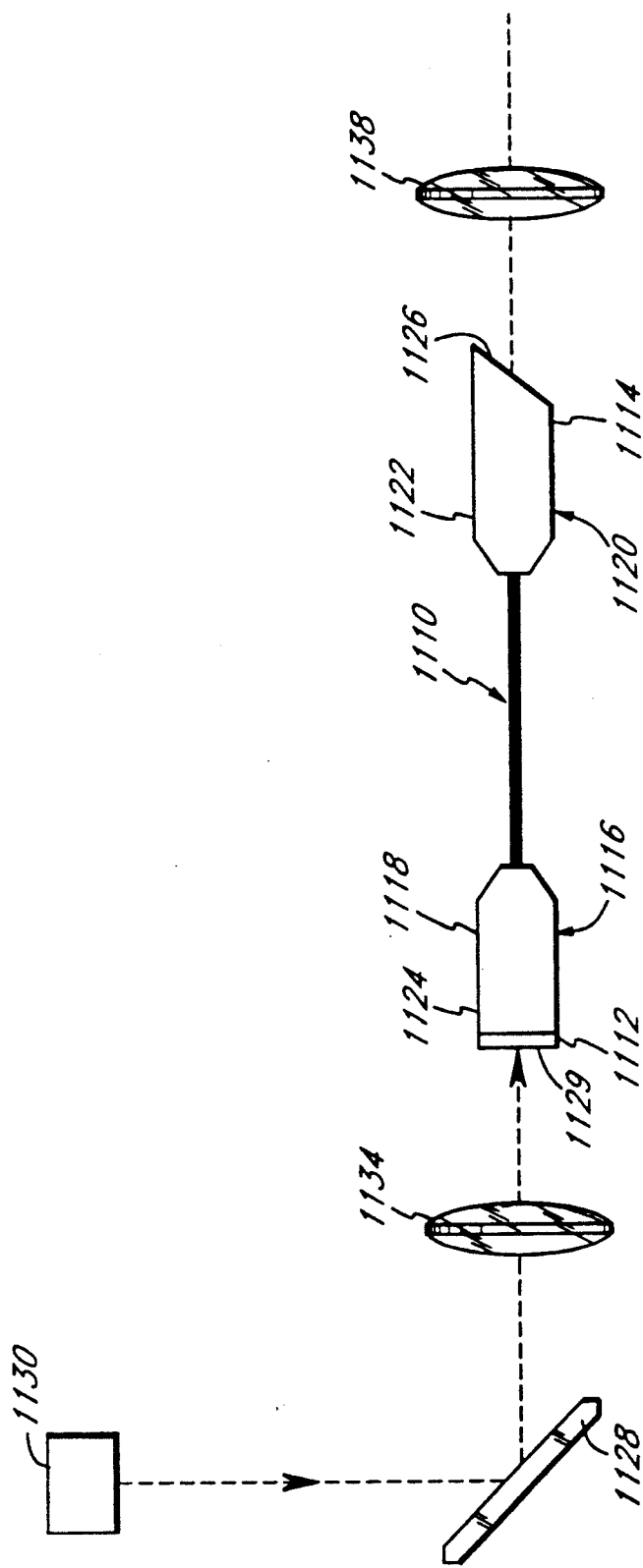
FIG. 10 illustrates an exemplary embodiment of a broadband source of the present invention comprising a Neodymium-doped fiber operated in forward single-pass configuration.

Reference is now made to FIG. 10 which shows a schematic representation of a fiber source of the present invention, doped with Neodymium. In FIG. 10, the same reference numbers are used as in FIG. 1, with the only difference that they have all been prefixed by the numeral 1. The fiber 1110 used in the embodiment of FIG. 10 is a 16.5 m $Nd_2O_3$ doped single-mode fiber co-doped with phosphorus. Such a fiber is doped with 0.02% of Neodymium in weight. It has a core diameter of 6 μm and a cutoff wavelength of 920 nm. Such a fiber is readily available and can be supplied by BTRL, a fiber manufacturer. In the embodiment of FIG. 10, the fiber 1110 is operated in the double-pass, forward-signal configuration using a high reflector at 1.06 μm. This means that the proximal end 1116 of the fiber 1110 has been polished and ground so that it defines a planar surface 1124 substantially perpendicular to the longitudinal axis of the first end portion 1116. The planar surface 1124 transmits the pump radiation but reflects the backward signal emitted by the fiber. The distal end of the fiber 1110 is ground and polished at an angle greater than 10°, e.g., in the embodiment of FIG. 10, at approximately 15° with respect to the transversal axis of the second end portion 1120. The planar surface 1126 guarantees no reflection and hence no resonant structure.

The fiber source of the present invention further preferably comprises a second dichroic mirror 1129, mounted on the first end 1112 of the optical fiber 1110. The mirror 1129 preferably has a flat reflective surface and is mounted with respect to the first end 1112 so that the flat reflective surface of the mirror 1129 is parallel with the surface 1124 of the first end 1112. Thus, a line normal to the flat reflective surface of the mirror 1129 is aligned with the longitudinal axis of the first end portion 1116 of the optical fiber 1110. In such an embodiment of the invention, the first capillary tube 1118 is advantageously used as a mounting surface for the mirror 1129 to provide the above-described alignment. The mirror 1129 may be attached to the first capillary tube 1118 with a suitable adhesive. In another embodiment of the invention, the mirror 1129 is fabricated by depositing reflective coatings on the first end 1112 of the optical fiber 1110.

In another embodiment of the present invention, there is no mirror mounted on the first end 1112 of the optical fiber 1110 but the planar surface 1124 is polished flat so that it provides a 4% reflective surface. Thus, in such a configuration, the planar surface 1124 provides a 4% reflective surface for both the wavelengths of the pump light and the output light. The planar surface thus transmits 96% of the pump optical signal and substantially reflects 4% of the light emitted by the fiber source. Although the reflectivity of the planar surface is low for the output light (4%), it is sufficient to produce laser emission in the cavity of the laser of the present invention. In the aforementioned embodiments wherein the mirror is positioned such that a line normal to the flat reflective surface of the mirror 1129 is aligned with the longitudinal axis of the first end portion 1116 of the optical fiber 1110, the characteristics of the dichroic mirror 1129 must be such that the mirror is essentially transmissive at the pump wavelength and essentially reflective at the output light wavelength. In the embodiment shown in FIG. 10, the characteristics of the mirror 1128 are inverse due to the different positioning of the pump source and the detector and the angular inclination of the mirror 1128.

Figure 11:
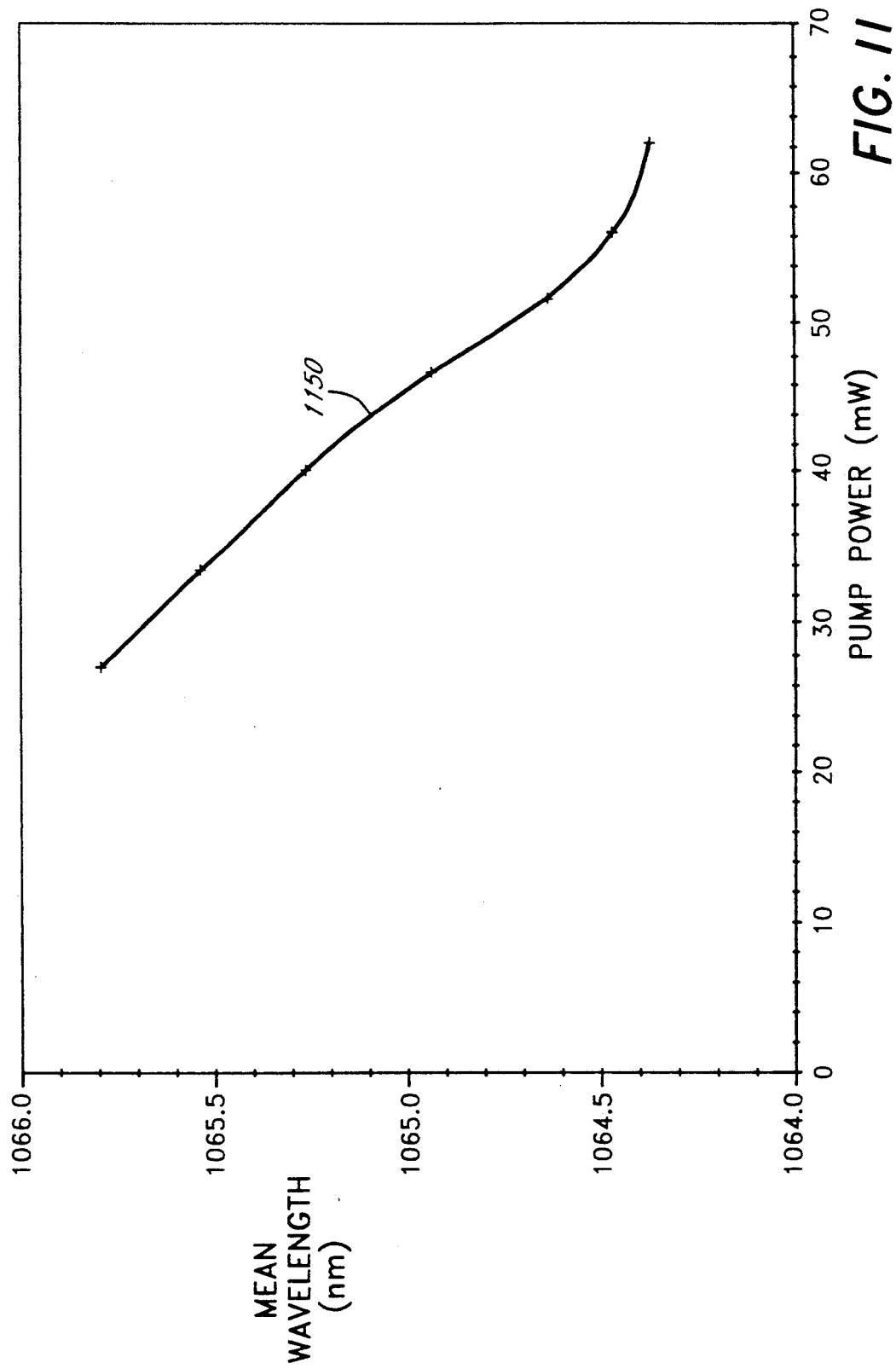
FIG. 11 shows a graph illustrating the dependence of the mean wavelength on the pump wavelength for the fiber source of the present invention using a Nd:silica fiber operated in the double-pass, forward-signal configuration for two pump power levels and for a 16.5 m long fiber, doped with 0.02 wt % $Nd_2O_3$ and co-doped with Phosphorus.

When pumped with 62 mW of pump power at 826.6 nm, the intrinsic thermal dependence is measured to be −6 ppm/°C. Reference is now made to FIG. 11 which represents the pump power dependence of the fiber, i.e., the second term of the governing equation. Only one curve 1150 has been represented for a pump wavelength of 826.6 nm. FIG. 11 is analogous to FIG. 4 in the case of Erbium. The curve 1150 has a negative slope, which implies that the first factor of the second term cannot be zero, at least for the particular pump wavelength used for plotting the curve 1150.

Figure 12:
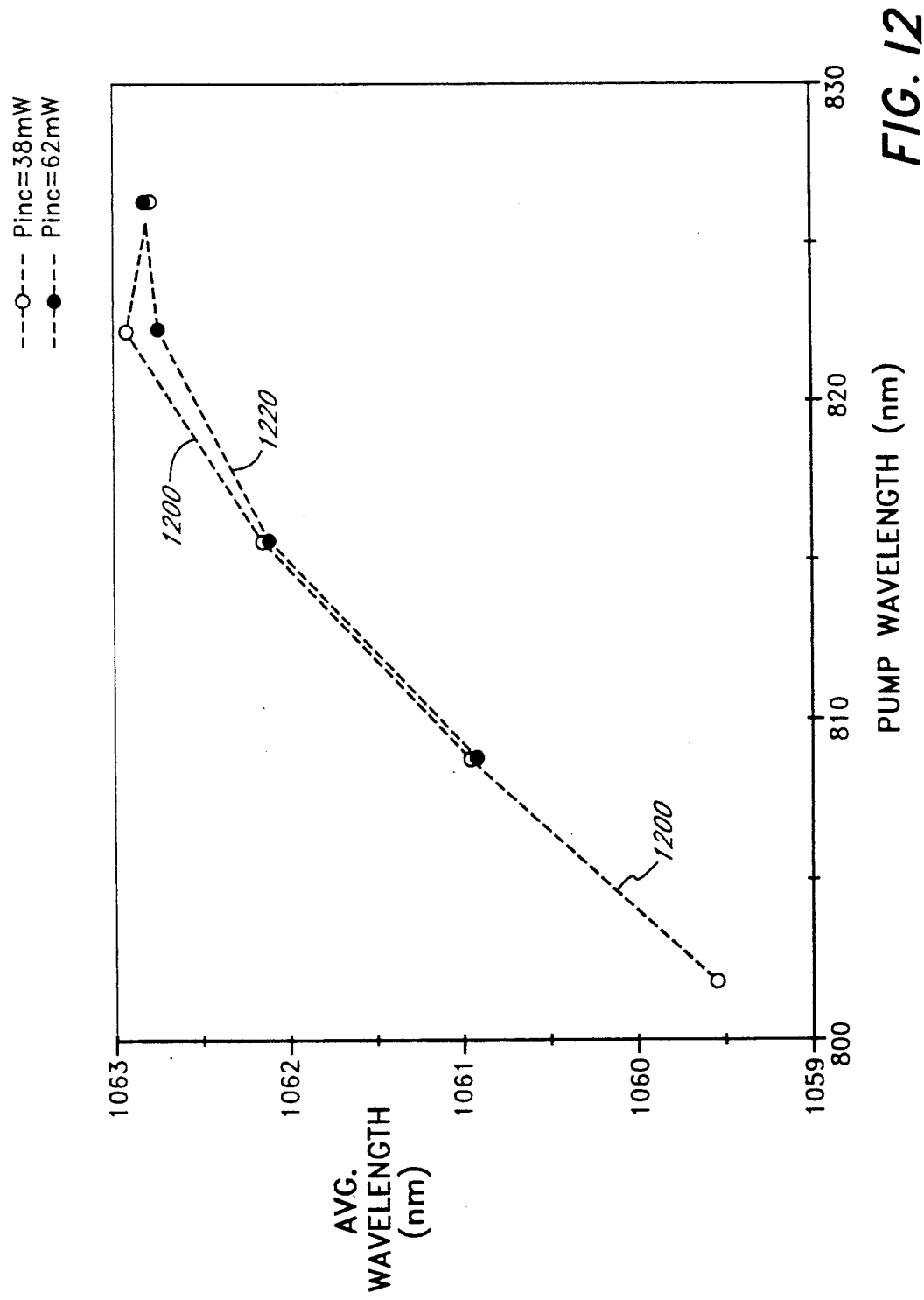
FIG. 12 shows the graph illustrating the dependence of the mean wavelength on the pump wavelength for the fiber source of the present invention using a Nd:silica fiber operated in the double-pass, forward-signal configuration.

Reference is also made to FIG. 12, which illustrates the pump wavelength dependence (third term of the governing equation) of the Neodymium fiber source for two pump power levels, namely 38 mW (curve 1200) and 62 mW (curve 1220). FIG. 12 is analogous to FIG. 6 in the case of Erbium. Unlike the curves of FIG. 6 for Erbium, the curves 1200 and 1220 for Neodymium do not seem to show a minimum, which would indicate that the third term of the governing equation cannot be made equal to zero.

The results illustrated in FIGS. 11 and 12 are all consistent with the background presented above. The intrinsic dependence is negative and less than 10 ppm/°C. in absolute value, indicating a substantial improvement over conventional semiconductor sources with expected coefficients of −300 ppm/°C. The pump power dependence (FIG. 11) has a negative slope over the tested range with a slope between −0.054 nm/mW (−50 ppm/mW) and −0.02 (−19 ppm/mW) indicating a need to control the source power to within 0.05 mW in the best case to obtain a temperature stability of about 1 ppm. The sign of the slope is negative in this case because the peak of the spectrum is shifted to shorter wavelengths than the mean wavelength. When the pump power increases, the spectrum narrows as gain at the peak far exceeds gain at the edges of the spectrum. More importantly, this process shifts the mean closer to the peak. The effect may decrease as the width approaches a minimum and may even increase with high power due to inhomogeneous saturation. The wavelength dependence (FIG. 12) takes various slopes between 0.20 nm/nm and 0.013 nm/nm which, for a pump diode dependence of −300 ppm/°C., would produce a wavelength dependence term between −46 ppm/°C. and −3 ppm/°C. The positive slope on FIG. 12 indicates that longer wavelength pump absorption correlates with longer wavelength signal emission in this sitedependent pumping process. Assuming perfect control of the pump power using pump diode current control, the other terms contribute at least −9.0 ppm/°C. which requires temperature control to better than 0.11°C. for a 1 ppm variation. This is an improvement by a factor of 30 over a semiconductor source.

While the embodiment of FIG. 10 is already a great improvement over other known sources with respect to temperature dependence, the method of the present invention can substantially improve that dependence. In the case of Erbium, the terms of the governing equation have different signs, making it possible to adjust the value of the pump wavelength and of the pump power so that the sum of all the terms of the governing equation goes to zero. However, unlike Erbium for which it was possible to cancel each of the terms of the equation separately, the terms of the governing equation are not so easily cancelled in the case of Neodymium.

According to the method of the present invention applied to a Neodymium-doped fiber, the first term and the third term are calculated for several pump powers, using FIG. 11 and assuming the thermal coefficient does not vary much with the pump wavelength or the pump power. Then, using FIG. 11, it is possible to select a pump wavelength for which the sum of the three coefficients is as small as possible. It can be noted that the curves in FIGS. 11 and 12 are quasi linear and that, therefore, the terms in the governing equation are essentially fixed. By contrast, in the case of Erbium, the control of all three terms is much greater, especially the wavelength dependence term which can assume a range of values.

All the above measurements may vary for different fibers, different fiber lengths and different feedback conditions, for example when the fiber source is coupled to the optical loop of a gyroscope. Such measurements would lead to different optimal values for the pump wavelength and the pump power. A gyroscope may provide a high level of feedback which may alter the evolution of signals in the source fiber. However, the data presented indicates that the Erbium-doped superfluorescent fiber source should provide adequate source power (>1 mW) in a broad bandwidth (>15 nm) when pumped with a high power (>75 mW) single-stripe diode laser in the 980 nm pump band. The use of the three terms in the governing equation to partially or totally compensate for each other allows an Erbium-doped superfluorescent fiber source to be extremely stable and far superior to any other rare earth doped superfluorescent fiber source or conventional superluminescent diodes. Optimal combinations of pump power and pump wavelength can produce a net dependence less than 1 ppm°C., thereby improving by a factor of 5 to 10 the temperature dependence of the best known fiber sources.

The method of the present invention is also applicable to fibers sources other than superfluorescent fiber sources. For example, it can also be applied to all other fiber sources that recirculate photons to create greater saturation along the entire fiber length and produce greater power. For example, the resonant fiber laser (RFL) is the standard laser produced when mirrors are added to the fiber ends while the wavelength swept fiber laser (WSFL) differs in that it includes an intracavity acoustooptic modulator (AOM). The WSFL utilizes a retroreflected first-order beam from the AOM to complete the round-trip path of the recirculating photons. An FM signal applied to the AOM slowly sweeps the wavelength of the WSFL to produce a broadband source for an integrating system. The details of the WSFL are disclosed in patent application Ser. No. 403,703, filed on Sep. 6, 1989, and assigned to the same assignee as the present invention. This application is hereby incorporated by reference herein. By obtaining the three curves corresponding to the three contributions in the governing equation, it is possible to apply the method of the present invention to any source.

Application of the Fiber Source of the Present Invention to a Fiber Optic Gyroscope (FOG)

Figure 13:
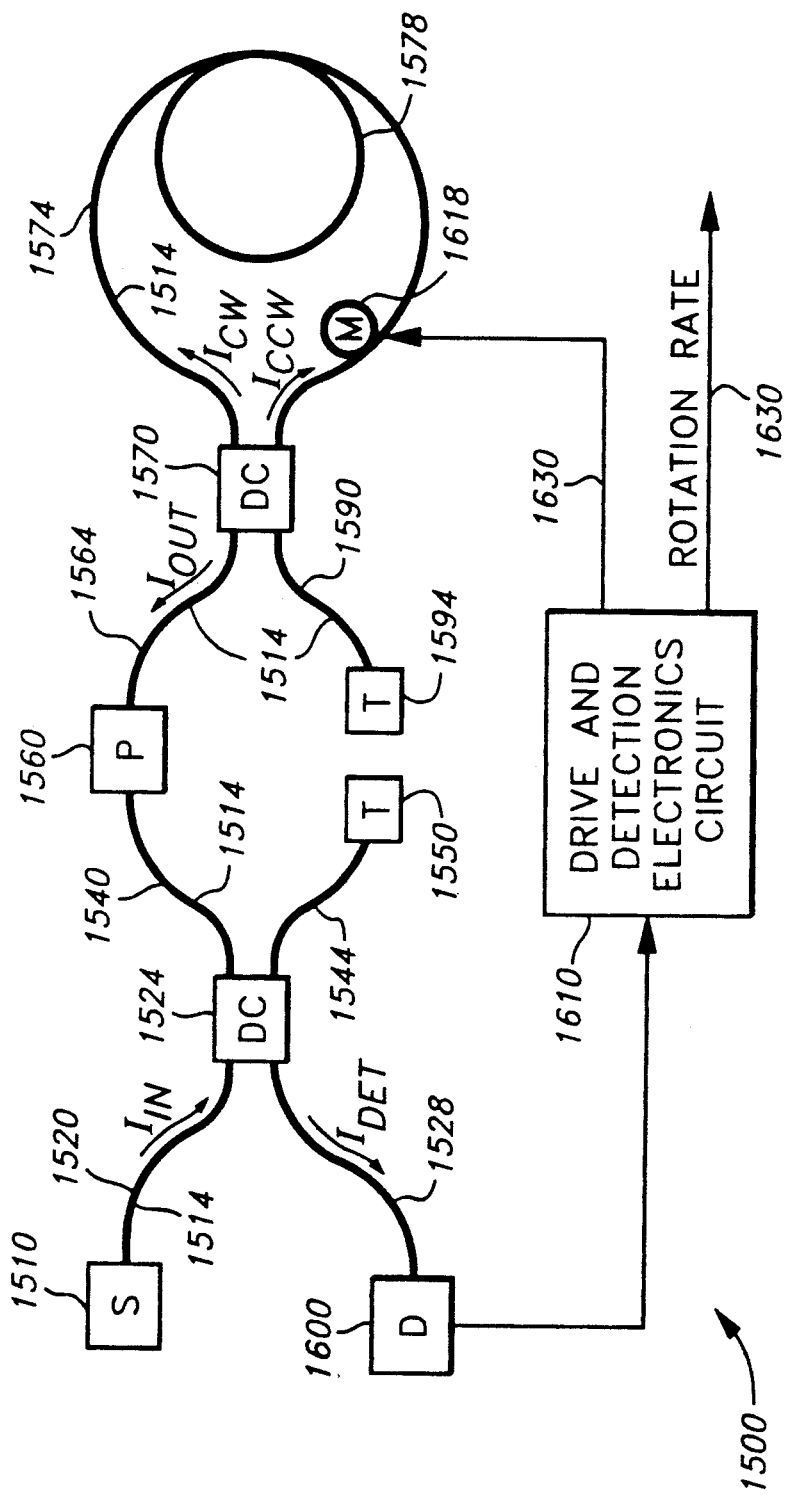
FIG. 13 represents an exemplary rotation sensor using the fiber source of the present invention.

The fiber source of the present invention is particularly useful as a broadband optical source for an optical fiber rotation sensor. An exemplary rotation sensor 1500 that can be advantageously used in combination with the fiber source of the present invention is illustrated in FIG. 13. The rotation sensor 1500 comprises a Sagnac interferometer which includes a light source (S) 1510 which provides an optical input signal $I_{IN}$, represented by an arrow. The light source (S) is advantageously the fiber source of the present invention, for example the embodiment of FIG. 1. The input signal $I_{IN}$ is coupled to a first optical fiber 1514 which is preferably a single-mode birefringent optical fiber. The first optical fiber 1514 includes a first optical fiber segment 1520 that serves as the input to the rotation sensor 1500. The first optical fiber segment 1520 provides a propagation path to a first optical directional coupler (DC) 1524, which, in preferred embodiments of the rotation sensor 1500, is constructed by juxtaposing two fibers. Details of such a coupler are disclosed in U.S. Pat. Nos. 4,493,528; 4,536,058; 4,564,262; and 4,601,541. These patents are hereby incorporated by reference herein. Those skilled in the art will appreciate that integrated optical couplers may also be utilized.

As set forth in the referenced patents, the first optical fiber segment 1520 is connected to one port of the first directional coupler 1524. The first directional coupler 1524 is formed by juxtaposing a second optical fiber 1528 with first optical fiber 1514. The second optical fiber 1528 is also advantageously a birefringent single-mode optical fiber. The second optical fiber 1528 includes a second optical fiber segment 1532 connected to an adjacent port of the first directional coupler 1524.

The first directional coupler 1524 has two additional ports, one of which is connected to a third optical fiber segment 1540 and the other of which is connected to a fourth optical fiber segment 1544.

In preferred embodiments of the rotation sensor 1500, the first directional coupler 1524 is constructed so that approximately 50% of the optical energy propagating in the first optical fiber segment 1520 from the light source 1510 towards the first directional coupler 1524 is directly transmitted to the third optical fiber segment 1540 and approximately 50% of the optical energy is coupled to the fourth optical fiber segment 1544. It should be understood that the first directional coupler 1524 is bidirectional in that optical energy propagating in the third optical fiber segment 1540 toward the first directional coupler 1524 is divided substantially equally between the first optical fiber segment 1520 and the second optical fiber segment 1528.

The fourth optical fiber segment 1544 is terminated by a first light-absorbing terminator (T) 1550. The first light-absorbing terminator 1550 absorbs substantially all the optical energy incident on it from the fourth optical fiber segment 1544 so that substantially no light is reflected back towards the first directional coupler 1524.

The third optical fiber segment 1540 provides a propagation path from the first directional coupler 1524 to a polarizer (P) 1560. Those skilled in the art will recognize that the polarizer is advantageous in that it reduces certain types of phase errors. If no polarizer is used, reduction of phase errors may be achieved through use of unpolarized light, as described in U.S. Pat. No. 4,529,312 and U.S. Pat. No. 4,634,282. These patents are hereby incorporated by reference herein. The polarizer can be constructed in accordance with a number of different embodiments, and is advantageously constructed in accordance with U.S. Pat. No. 4,386,822. This patent is hereby incorporated by reference herein. The polarizer 1560 is further connected to a fifth optical fiber segment 1564 such that light incident to the polarizer 1560 from the third optical fiber segment 1540 is output from the polarizer 1560 on the fifth optical fiber segment 1564. As is known to one skilled in the art, a single-mode optical fiber, such as the first optical fiber 1514, typically propagates light in first and second orthogonal polarization modes. The polarizer 1560 operates to block the light in one of the two polarization modes (e.g., the second polarization mode) so that the light propagating in the fifth optical fiber segment 1564 away from the polarizer 1560 comprises light in substantially only the first polarization modes (i.e., polarized light).

The polarized light from the polarizer 1560 propagates via the fifth optical fiber segment 1564 to a port of a second directional coupler (DC) 1570. The second directional coupler 1570 couples the light to a sixth optical fiber segment 1574 of the first optical fiber 1514. The sixth optical fiber segment 1574 is formed into a loop 1578 which lies in a plane generally perpendicular to the axis around which the loop is to be rotated. The sixth optical fiber segment 1574 returns to an adjacent port of the second directional coupler 1570 which thus closes the loop 1578. The first optical fiber 1514 extends from the second directional coupler 1570 to form a seventh optical fiber segment 1590. The seventh optical fiber segment 1590 is terminated by a second light-absorbing terminator (T), an optical detector (D) 1600 which detects the intensity of the optical energy in the second optical fiber segment 1528 and thus detects the intensity of the combined optical energy from the loop 1578. The detector 1600 provides an electrical output signal on a line 1604 that is responsive to the detected intensity. As is well known in the art, the intensity of the combined optical energy from the loop 1578 depends upon the relative phases of the two counterpropagating optical signals, which in turn depends in part upon the rotation rate of the loop 1578.

Various apparatuses and techniques for converting the detected optical intensity to an output signal representing the magnitude and angular direction of rotation are disclosed in the aforementioned U.S. Pat. No. 4,410,275; U.S. Pat. No. 4,456,377; U.S. Pat. No. 4,487,330; U.S. Pat. No. 4,634,282; and U.S. Pat. No. 4,637,722. These patents are hereby incorporated by reference herein. For example, a drive and detection electronics circuit block 1610 is illustrated. The drive and detection electronics circuit block 1610 provides an electrical output signal on a line 1614 which is coupled to a phase modulator (M) 1618. The phase modulator 1618 is coupled to the sixth optical fiber segment 1574 at a position offset from the center of the loop 1578. The drive and detection electronics circuit block 1610 drives the phase modulator 1618 with a specific frequency that is selected to modulate the phase of the two counterpropagating optical signals $I_{CW}$ and $I_{CCW}$. The drive and detection electronics circuit block 1610 further uses the specific frequency to synchronously demodulate the electrical representation of the optical output signal on the line 1604 to provide an electrical output signal on a line 1630 that represents the rotation rate of the loop 1578. Additional details of the operation of the rotation sensor can be found in the aforementioned U.S. Pat. No. 4,410,275; U.S. Pat. No. 4,456,377; U.S. Pat. No. 4,487,330; U.S. Pat. No. 4,634,282; and U.S. Pat. No. 4,637,722. These patents are hereby incorporated by reference herein. While the rotation sensor depicted in FIG. 13 is in closed loop configuration, it will be understood that other configurations may be used, such as described in U.S. Pat. No. 4,779,975 or in Ser. application No. 401,225, filed on Aug. 31, 1989, or in Ser. application No. 565,255, filed on Aug. 9, 1990, both assigned to the assignee of this application. This patent and these patent applications are hereby incorporated by reference herein.

Various embodiments of a broadband optical fiber source have been described above. Although the invention has been described with reference to these specific embodiments, the descriptions have been illustrative of the invention and are not intended to be limiting. In particular, the fiber source of the present invention can be doped with any other rare-earth suitable material. The method of the present invention is also applicable to other sources, such a resonant fiber laser and a wavelength-swept fiber laser, as well as sources comprising optical waveguides other than fibers. Various other modifications and applications may occur to those skilled in the art without departing from the true spirit and scope of the invention as defined in the appended claims.

We claim:

1. A broadband light source having an emission spectrum, said emission spectrum being characterized by a mean wavelength, said source comprising an active medium which is pumped at a pump wavelength by a pump source to cause said active medium to emit radiation, said pump source having a pump power and a pump wavelength which substantially minimize the sum of the intrinsic temperature dependence of the active medium, the pump power dependence of the mean wavelength and the pump wavelength dependence of the mean wavelength, said sum being defined as:

$$\frac{\delta <\lambda_s>}{\delta T} + \left(\frac{\delta <\lambda_s>}{\delta P}\right)\left(\frac{\delta P}{\delta T}\right) + \left(\frac{\delta <\lambda_s>}{\delta \lambda_p}\right)\left(\frac{\delta \lambda_p}{\delta T}\right)$$

wherein $<\lambda>$ is the means wavelength of the signal;
T is the temperature;
P is the pump power of the pump source; and
$\lambda_p$ is the wavelength of the light emitted by the pump source.

2. A broadband source as claimed in claim 1, wherein said pump source is a laser diode.

3. A broadband source as claimed in claim 1, wherein said active medium comprises a single-mode fiber doped with lasing material.

4. A broadband source as claimed in claim 3, wherein said lasing material includes Erbium.

5. A broadband source as claimed is claim 3, wherein said lasing material includes Neodymium.

6. A broadband source as claimed in claim 1, wherein the pump wavelength and the pump power are selected so as to obtain an extremum of the function $<\lambda_s> = \lambda (T, P, \lambda_p)$.

7. A broadband source as claimed in claim 1, wherein the pump wavelength and the pump power are selected such that one of the terms of the governing equation is zero, and the sum of the other two terms is as small as possible 8. A broadband source as claimed in claim 7, wherein the pump wavelength and the pump power are selected such that said other two terms are as close to zero as possible 9. A broadband source as claimed in claim 7, wherein the pump wavelength and the pump power are selected such that said other two terms are as substantially equal and of opposite signs 10. A broadband source as claimed in claim 1, wherein the pump wavelength is selected to correspond to a peak pump absorption rate of the pump source.

11. A broadband source as claimed in claim 1, wherein the pump wavelength is selected to be close but not equal to a peak pump absorption rate wavelength.

12. A broadband source as claimed in claim 10, wherein said peak pump absorption rate wavelength is near 980 nm.

13. A broadband source as claimed in claim 1, wherein the pump wavelength and the pump wavelength are selected so that the total variation of the mean wavelength with respect to temperature is less than 10 ppm/°C.

14. A broadband source as claimed in claim 13, wherein the pump wavelength and the pump wavelength are selected so that the total variation of the mean wavelength with respect to temperature is approximately 1 ppm/° C.

15. A broadband source as claimed in claim 1, further comprising an optical fiber having an input and an output ends and having at least a reflector positioned proximate to said input end of said optical fiber.

16. A broadband source as claimed in claim 15, wherein said reflector is substantially reflective to said emitted radiation and substantially transmissive to said pump light.

17. A broadband source as claimed in claim 15, wherein said reflector is substantially transmissive to said emitted radiation and substantially reflective to said pump light.

18. A broadband source as claimed in claim 15, wherein said reflector is a dichroic mirror.

19. A broadband source as claimed in claim 1, further comprising a backward single pass configuration.

20. A broadband source as claimed in claim 1, further comprising a forward single pass configuration.

21. A broadband source as claimed in claim 1, further comprising a backward double pass configuration.

22. A broadband source as claimed in claim 1, further comprising a forward single pass configuration.

23. A broadband source as claimed in claim 1, further comprising a resonant fiber laser.

24. A broadband source as claimed in claim 1, further comprising a wavelength swept fiber laser.

25. An optical sensor for sensing an ambient effect comprising:
a loop comprising an optical fiber having two polarization modes; and
a broadband light source for introducing light into said loop, said source having an active medium which emits radiation in an emission spectrum in response to application of pump energy to said active medium, said active medium being pumped at a pump wavelength by a pump source to cause said active medium to emit radiation, said pump source having a pump power and a pump wavelength which substantially minimize the sum of the intrinsic temperature dependence of the active medium, the pump power dependence of the mean wavelength and the pump wavelength dependence of the mean wavelength, said sum being defined as:

$$\frac{\delta<\lambda_s>}{\delta T} + \left(\frac{\delta<\lambda_s>}{\delta P}\right)\left(\frac{\delta P}{\delta T}\right) + \left(\frac{\delta<\lambda_s>}{\delta\lambda_p}\right)\left(\frac{\delta\lambda_p}{\delta T}\right)$$

wherein
$<\lambda_s>$ is the means wavelength of the signal;
T is the temperature;
P is the pump power of the pump source; and
$\lambda_p$ is the wavelength of the light emitted by the pump source.

26. An optical sensor for sensing an ambient effect as claimed in claim 25, wherein said ambient effect is rotation.

27. An apparatus, comprising:
an interferometer;
a pump light source that emits pump light and
a broadband light source having an emission spectrum, said emission spectrum being characterized by a mean wavelength, said source comprising an active medium, said active medium being pumped at a pump wavelength by said pump source to cause said active medium to emit radiation, said pump source having a pump power and a pump wavelength which substantially minimize the sum of the intrinsic temperature dependence of the active medium, the pump power dependence of the means wavelength and the pump wavelength dependence of the mean wavelength, said sum being defined as:

$$\frac{\delta<\lambda_s>}{\delta T} + \left(\frac{\delta<\lambda_s>}{\delta P}\right)\left(\frac{\delta P}{\delta T}\right) + \left(\frac{\delta<\lambda_s>}{\delta\lambda_p}\right)\left(\frac{\delta\lambda_p}{\delta T}\right)$$

wherein
$<\lambda_s>$ is the mean wavelength of the signal;
T is the temperature;
P is the pump power of the pump source; and
$\lambda_p$ is the wavelength of the light emitted by the pump source.

28. The apparatus as claimed in claim 27, wherein said interferometer comprises a Sagnac interferometer.

29. The apparatus as claimed in claim 27, wherein said active medium comprises an Erbium-doped single mode optical fiber.

30. The apparatus as claimed in claim 27, wherein said active medium comprises a Neodymium-doped single mode optical fiber.

31. A method for stabilizing the temperature dependence of a broadband source comprising an active medium and having an emission spectrum, comprising the steps of:
pumping an active medium by means of a pump source at a pump wavelength to cause said active medium to emit radiation, said emission spectrum being characterized by a mean wavelength; and
selecting the pump power and the pump wavelength of said pump source so as to minimize the total variation of the mean wavelength with respect to temperature, said pump power and said pump wavelength minimizing the sum of the intrinsic temperature dependence of the active medium, the pump power dependence of the mean wavelength and the pump wavelength dependence of the mean wavelength, said sum being defined as:

$$\frac{\delta<\lambda_s>}{\delta T} + \left(\frac{\delta<\lambda_s>}{\delta P}\right)\left(\frac{\delta P}{\delta T}\right) + \left(\frac{\delta<\lambda_s>}{\delta \lambda_p}\right)\left(\frac{\delta \lambda_p}{\delta T}\right)$$

wherein
$<\lambda_s>$ is the mean wavelength of the signal;
T is the temperature;
P is the pump power of the pump source; and
$\lambda_p$ is the wavelength of the light emitted by the pump source.

32. Method for stabilizing the temperature of a broadband source as defined in claim 31, further comprising the step of selecting the active material of the active medium among the rare earth group.

33. Method for stabilizing the temperature of a broadband source as defined in claim 31, further comprising the step of selecting an optical fiber for supporting the active medium.

34. Method for stabilizing the temperature of a broadband source as defined in claim 31, further comprising the step of selecting a value of the pump wavelength and of the pump power such as to obtain an extremum of the following function $<\lambda_s>=\lambda$ (T, P, $\lambda_p$).

35. Method for stabilizing the temperature of a broadband source as defined in claim 31, further comprising the step of selecting a value of the pump wavelength and of the pump power such that one of the terms of the governing equation is zero, and the sum of the other two terms is as small as possible.

36. Method for stabilizing the temperature of a broadband source as defined in claim 35, further comprising the step of selecting said pump wavelength and said pump power such that said other two terms are as close to zero as possible.

37. Method for stabilizing the temperature of a broadband source as defined in claim 35, further comprising the step of selecting said pump wavelength and said pump power such that said other two terms are substantially equal and of opposite signs.

38. Method for stabilizing the temperature of a broadband source as defined in claim 31, further comprising the step of selecting the pump wavelength to approximately correspond to a peak pump absorption rate of the pump source.

39. Method for stabilizing the temperature of a broadband source as defined in claim 31, further comprising the step of selecting the pump wavelength to be close but not equal to a peak pump absorption rate wavelength.

40. Method for stabilizing the temperature of a broadband source as defined in claim 38, wherein said peak pump absorption rate wavelength is near 980 nm.

41. Method for stabilizing the temperature of a broadband source as defined in claim 31, further comprising the step of selecting the pump wavelength and the pump wavelength so that the total variation of the mean wavelength with respect to temperature is less than 10 ppm/°C.

42. Method for stabilizing the temperature of a broadband source as defined in claim 41, further comprising the step of selecting the pump wavelength and the pump wavelength so that the total variation of the mean wavelength with respect to temperature is approximately 1 ppm/°C.

* * * * *